(12) United States Patent
Park et al.

(10) Patent No.: US 12,474,425 B2
(45) Date of Patent: Nov. 18, 2025

(54) HIGHLY ACCELERATED SUB-MILLIMETER RESOLUTION 3D GRASE WITH CONTROLLED T2 BLURRING IN T2-WEIGHTED FUNCTIONAL MRI AT 7 TESLA

(71) Applicant: Advanced MRI Technologies, LLC, Sebastopol, CA (US)

(72) Inventors: Suhyung Park, Sebastopol, CA (US); David Feinberg, Sebastopol, CA (US)

(73) Assignee: Advanced MRI Technologies, LLC, Sebastopol, CA (US)

( * ) Notice: Subject to any disclaimer, the term of this patent is extended or adjusted under 35 U.S.C. 154(b) by 380 days.

(21) Appl. No.: 17/745,761

(22) Filed: May 16, 2022

(65) Prior Publication Data

US 2023/0366965 A1 Nov. 16, 2023

(51) Int. Cl.
- *G01V 3/00* (2006.01)
- *G01R 33/48* (2006.01)
- *G01R 33/50* (2006.01)
- *G01R 33/56* (2006.01)
- *G01R 33/561* (2006.01)

(52) U.S. Cl.
CPC ..... *G01R 33/5608* (2013.01); *G01R 33/4818* (2013.01); *G01R 33/50* (2013.01); *G01R 33/5615* (2013.01)

(58) Field of Classification Search
CPC ........... G01R 33/5608; G01R 33/4818; G01R 33/50; G01R 33/5615
USPC ...................................................... 324/307
See application file for complete search history.

(56) References Cited

U.S. PATENT DOCUMENTS

| | | | |
|---|---|---|---|
| 2009/0082656 A1* | 3/2009 | Bayram | G01R 33/5611 324/312 |
| 2012/0212222 A1* | 8/2012 | Subramanian | G01R 33/5617 324/309 |

FOREIGN PATENT DOCUMENTS

| | | | | |
|---|---|---|---|---|
| RU | 2707661 C2 | * | 11/2019 | ......... G01R 33/4824 |
| WO | WO-9301509 A1 | * | 1/1993 | ......... G01R 33/5615 |
| WO | WO-2009037711 A2 | * | 3/2009 | ............ A61B 8/4209 |
| WO | WO-2020181263 A1 | * | 9/2020 | .............. A61B 5/004 |

* cited by examiner

*Primary Examiner* — Walter L Lindsay, Jr.
*Assistant Examiner* — Frederick Wenderoth
(74) *Attorney, Agent, or Firm* — Wissing Miller LLP

(57) ABSTRACT

Accelerated GRASE with controlled T2 blurring improves a point spread function (PSF) and temporal signal-to-noise ratio (tSNR) with many slices. The approach seeks to minimize a trade-off between SNR and blurring for functional sensitivity, and uses a new GRASE-optimized random encoding, which takes into accounts for the complex signal decays of T2 and T2* weightings, by achieving incoherent aliasing for constrained reconstruction. Numerical and experimental studies validate the effectiveness of the new method over regular and VFA GRASE (R- and V-GRASE).

17 Claims, 18 Drawing Sheets

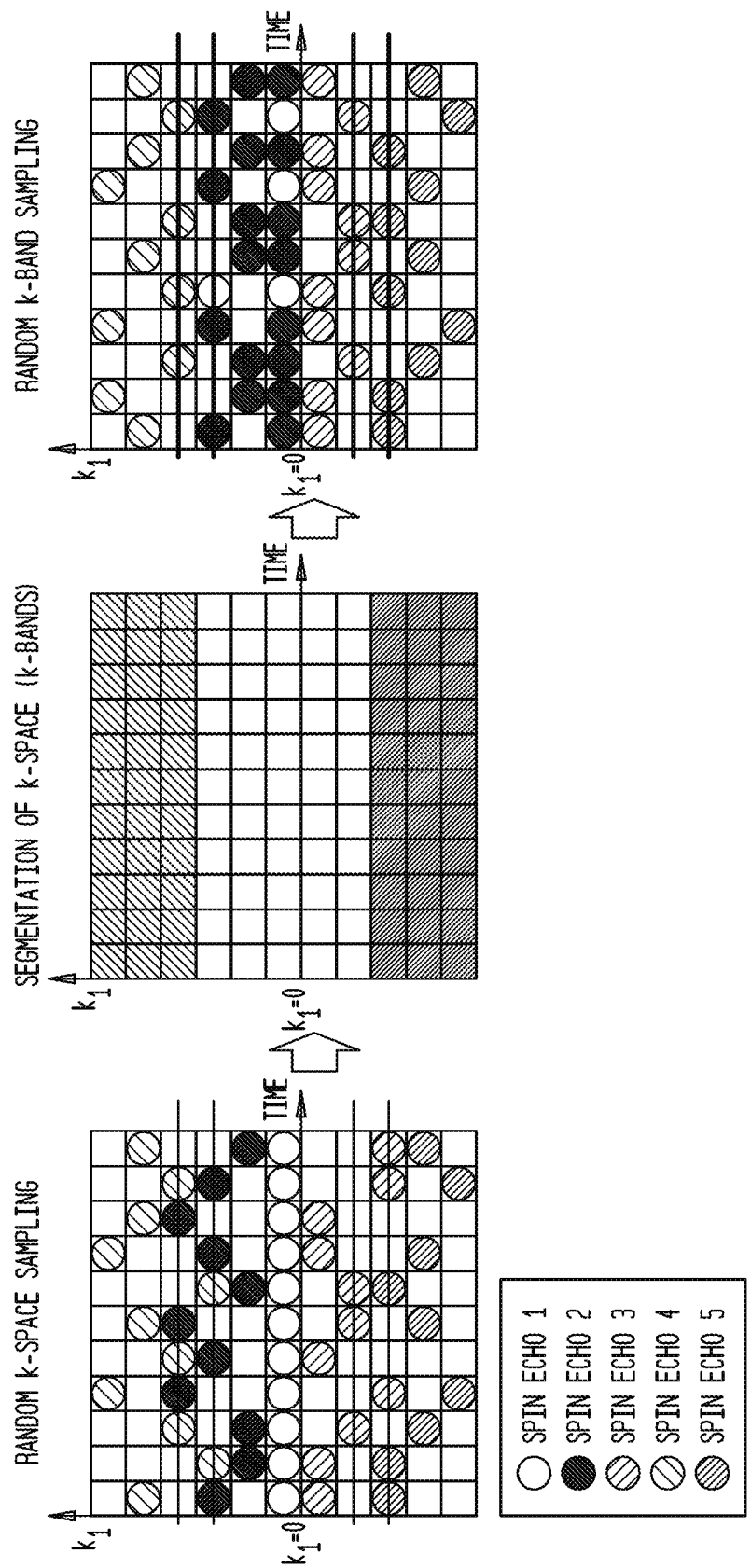

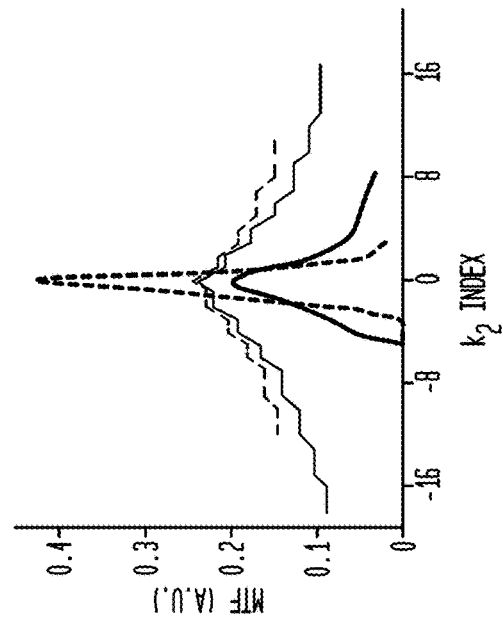
FIG. 6C
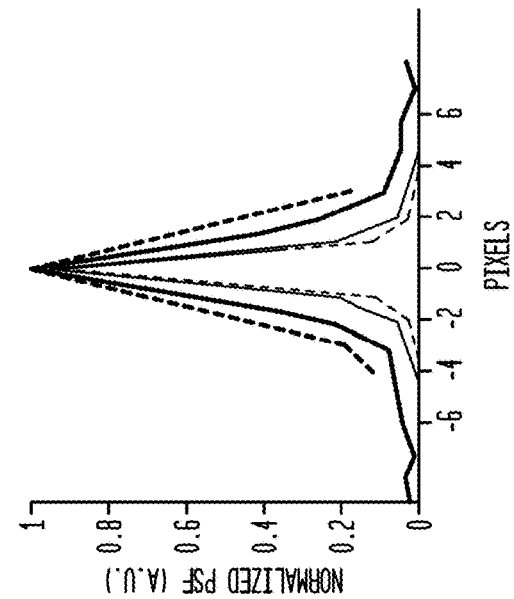
FIG. 6B
FIG. 6A

ACTIVATION MAPS (AXIAL AND CORONAL PLANES)

TEMPORAL FOURIER TRANSFORM:

KARHUNEN-LOEVE TRANSFORM:

HIGHLY ACCELERATED SUB-MILLIMETER RESOLUTION 3D GRASE WITH CONTROLLED T2 BLURRING IN T2-WEIGHTED FUNCTIONAL MRI AT 7 TESLA

FIELD

This patent specification relates to MRI imaging and more specifically to new ways of achieving highly accelerated sub-millimeter resolution T2-weighted functional MRI by developing a three-dimensional gradient and spin echo imaging (GRASE) with inner-volume selection and variable flip angles (VFA).

BACKGROUND

This patent specification cites references identified by numbers in parenthesis. The full citations are listed at the end of the written description. Each cited reference is hereby incorporated by reference.

Since the introduction of blood oxygen level dependent (BOLD) contrast (1, 2), functional MRI (fMRI) has become one of the commonly used methodologies for neuroscience. Many if not most fMRI studies have employed T2*-weighted gradient-echo echo-planar imaging (GE-EPI) due to its high signal-to-noise ratio (SNR) at lower field strengths (3-5). At ultra-high magnetic fields, improved SNR makes it possible to acquire T2-weighted BOLD signal with high spatial specificity for cortical columnar and layer imaging using spin-echo echo-planar imaging (SE-EPI) by reducing draining vein effects (6-9), in which BOLD effects originating from larger diameter draining veins can be significantly distant from the actual sites of neuronal activity.

To simultaneously achieve high spatial resolution while mitigating geometric distortion within a single acquisition, inner-volume selection approaches have been utilized (9-13). These approaches use slab selective excitation and refocusing RF pulses to excite voxels within their intersection and limit the field-of-view (FOV) in which the required number of phase-encoding (PE) steps are reduced at the same resolution so that the EPI echo train length becomes shorter along the phase encoding direction. Nevertheless, the utility of the inner-volume based SE-EPI has been limited to a flat piece of cortex with anisotropic resolution for covering minimally curved gray matter area (9-11). This makes it challenging to find applications beyond primary visual areas particularly in the case of requiring isotropic high resolutions in other cortical areas. 3D gradient and spin echo imaging (GRASE) with inner-volume selection, which applies multiple refocusing RF pulses interleaved with EPI echo trains in conjunction with SE-EPI, alleviates this problem by allowing for extended volume imaging with high isotropic resolution (12-14). One major concern of using GRASE is image blurring with a wide point spread function (PSF) in the partition direction due to the T2 filtering effect over the refocusing pulse train (15, 16). To reduce the image blurring, a variable flip angle (VFA) scheme (17, 18) has been incorporated into the GRASE sequence. The VFA systematically modulates the refocusing flip angles to sustain the signal strength throughout the echo train (19), thus increasing the BOLD signal changes in the presence of T1-T2 mixed contrasts (20, 21). Despite these advantages, VFA GRASE still leads to significant loss of temporal SNR (tSNR) due to reduced refocusing flip angles.

Accelerated acquisition in GRASE is an appealing imaging option to reduce both refocusing pulse and EPI train length at the same time. In this context, accelerated GRASE coupled with image reconstruction techniques holds a potential for either reducing image blurring or improving spatial volume along both partition and phase encoding directions. By exploiting multi-coil redundancy in signals, parallel imaging has been applied to all anatomy of the body and works for both 2D and 3D acquisitions (22-25). Kemper et al (19) explored a combination of VFA GRASE with parallel imaging to increase volume coverage. However, the limited FOV, localized by only a few receiver coils, potentially causes high geometric factor (g-factor) values due to ill-conditioning of the inverse problem by including the large number of coils that are distant from the region of interest, thus making it challenging to achieve detailed signal analysis. To address this issue, compressed sensing (CS), which uses either sparsity or low rank as an additional data redundancy (26-28), was combined with parallel imaging to regularize the inverse problem by exploiting complementary data redundancies with random under-sampling in k-t space (29-32). Among them, a few studies demonstrated the feasibility of the accelerated fMRI using nonlinear reconstruction for BOLD characterization (33-37). Nevertheless, accelerated GRASE acquisition and reconstruction still has challenges in that 1) multiple signal decays of T2 and T2* contrasts cause double peaks in k-space, 2) signal variations between the same phase encoding (PE) lines across time introduce image distortions during reconstruction with temporal regularization. To address these issues, BOLD activation needs to be separately evaluated for both spatial and temporal characteristics.

SUMMARY OF THE DISCLOSURE

This patent specification discusses accelerated GRASE fMRI with controlled T2 blurring to achieve improved PSF and tSNR with a large number of slices, using an optimized VFA scheme and a new GRASE sampling approach, in which the VFA scheme is designed to minimize a trade-off between SNR and blurring, while the GRASE-optimized random sampling is used to achieve incoherent aliasing in the presence of the complex signal decays of T2 and T2* weightings. A time-series of fMRI images is then reconstructed under the framework of robust principal component analysis (k-t RPCA) (37-40) which can resolve possibly correlated information from unknown partially correlated images for reduction of serial correlations. Numerical simulations and experimental studies are performed to validate the effectiveness of the new method over regular and VFA GRASE at 7T, thus demonstrating that 1) partition random encoding with VFA increases the number of acquired slices while narrowing the PSF, 2) reduced TE from phase random encoding provides a high SNR efficiency, and 3) the reduced blurring and higher tSNR result in higher BOLD activations.

GRASE imaging has disadvantages in that 1) k-space modulation causes T2 blurring by limiting the number of slices and 2) a VFA scheme results in partial success with substantial SNR loss. This patent specification described new, accelerated GRASE with controlled T2 blurring to improve a point spread function (PSF) and temporal signal-to-noise ratio (tSNR) with a large number of slices. To this end, the VFA scheme is designed by minimizing a trade-off between SNR and blurring for functional sensitivity, and a new GRASE-optimized random encoding, which accounts for the complex signal decays of T2 and T2* weightings, is utilized by achieving incoherent aliasing for constrained reconstruction. Numerical and experimental studies described further below validate the effectiveness of the new method over regular and VFA GRASE (R- and V-GRASE).

According to some embodiments, the new method achieves 0.8 mm isotropic resolution, and functional MRI compared to R- and V-GRASE improves the spatial extent of the excited volume up to 36 slices with 52% to 68% full width at half maximum (FWHM) reduction in PSF but approximately 2- to 3-fold mean tSNR improvement, thus resulting in higher BOLD activations. The feasibility of the proposed method in T2-weighted functional MRI has been demonstrated. The new method is especially promising for cortical layer-specific functional MRI.

According to some embodiments, a magnetic resonance imaging (MRI) system comprises: a source of spatially slab-selective excitation and refocusing pulses applied along orthogonal directions to select a sub-volume of interest at their intersection in an object in a steady magnetic field; a source of refocusing radio frequency (RF) pulses successively applied to the object under a condition that includes 90-degree phase difference between the excitation and refocusing pulses, equidistant spacing between two consecutive refocusing pulses, and a constant spin defocusing in each echo spacing; a source of oscillating readout gradients with alternating polarities and phase encoding (PE) blips between the readout pulses, inserted between adjacent refocusing pulses and applied to the object to produce gradient echo (GE) and spin echo (SE) MRI signals; and an image processor configured to process the GE and SE MRI signals into images of the object in k-space, including by random encoding comprising randomly designated sampling selected to suppress inter-frame signal variations of the same MRI signals whole maintaining fixed contrast.

According to some embodiments, the system can further comprise one or more of the following additional features: (a) the random encoding can comprise segmenting a selected k-space in at least one dimension as multiple sub-bands by dividing the selected k-space into several frequency bands according to a selected probability density function (PDF) where the partition encoding is generated by randomly choosing a sample k-space band sequentially according to a centric reordering; (b) the PDF can conform to 1/wr, where wr is the number of k-space lines in the rth selected k-space band defined as: wr=ceil((r+1)/2; (c) the selected k-space can be kz-space; (d) a selected number of several of the last samples can be randomly determined from the rest of the peripheral upper and lower kz-spaces; (e) the slice and refocusing pulse numbers can be selected to balance between center and peripheral samples to yield a statistical blurring due to an acquisition bias in k-space; (f) the k-space can include, in addition to the selected kz-space, a ky-space and said processor can use the same number of ky-space lines between upper and lower k-spaces for a constant TE across time; (g) the maximum flip angle can be set to no more than 150 degrees; (h) said sources and image processor operate in an accelerated sub-millimeter resolution mode functional MRI (fMRI); and (h) said sources and image processor are configured to operate in a 3D GRAS with controlled T2 blurring in T2-weighted functional MRIE mode with controlled T2 blurring in T2-weighted fMRI mode.

According to some embodiments, a method of functional magnetic resonance imaging comprises: applying spatially slab-selective excitation and refocusing pulses along orthogonal directions to select a sub-volume of interest at their intersection in an object in a steady magnetic field; applying refocusing radio frequency (RF) pulses successively to the object under a condition that includes 90-degree phase difference between the excitation and refocusing pulses, equidistant spacing between two consecutive refocusing pulses, and a constant spin defocusing in each echo spacing; applying oscillating readout gradients with alternating polarities and phase encoding (PE) blips between the readout pulses, inserted between adjacent refocusing pulses and applied to the object to produce gradient echo (GE) and spin echo (SE) MRI signals; and computer-processing the GE and SE MRI signals into images of the object in k-space, including by random encoding comprising randomly designated sampling selected to suppress inter-frame signal variations of the same MRI signals whole maintaining fixed contrast.

According to some embodiments, a method of functional magnetic resonance imaging comprises: applying spatially slab-selective excitation and refocusing pulses along orthogonal directions to select a sub-volume of interest at their intersection in an object in a steady magnetic field; applying refocusing radio frequency (RF) pulses successively to the object under a condition that includes 90-degree phase difference between the excitation and refocusing pulses, equidistant spacing between two consecutive refocusing pulses, and a constant spin defocusing in each echo spacing; applying oscillating readout gradients with alternating polarities and phase encoding (PE) blips between the readout pulses, inserted between adjacent refocusing pulses and applied to the object to produce gradient echo (GE) and spin echo (SE) MRI signals; and computer-processing the GE and SE MRI signals into images of the object in k-space, including by random encoding comprising randomly designated sampling selected to suppress inter-frame signal variations of the same MRI signals whole maintaining fixed contrast.

According to some embodiments, the method described in the immediately preceding paragraph can additionally comprise one or more of the following: (a) the random encoding can comprise kz-space as multiple sub-bands by dividing into several frequency bands according to a selected probability density function (PDF) where the partition encoding is generated by randomly choosing a sample kz-space band sequentially according to a centric reordering; (b) the PDF can conform to 1/wr, where wr is the number of k-space lines in the rth kz-space band defined as: wr=ceil((r+1)/2; (c) a selected number of several of the last samples can be randomly determined from the rest of the peripheral upper and lower kz-spaces; (d) the slice and refocusing pulse numbers can be selected to balance between center and peripheral samples to yield a statistical blurring due to an acquisition bias in k-space; (e) said processing uses the same number of ky-space lines between upper and lower k-spaces for a constant TE across time; (f) the maximum flip angle can be set to no more than 150 degrees; (g) said sources and image processor can operate in an accelerated sub-millimeter resolution mode functional MRI (fMRI); and (g). said sources and image processor can be configured to operate in a 3D GRASE mode with controlled T2 blurring in T2-weighted fMRI mode.

According to some embodiments, an accelerated sub-millimeter Resolution 3D GRASE with controlled T2 blurring in T2-weighted functional MRI method comprises modifying a GRASE MRI method by: applying refocusing radio frequency (RF) pulses successively under a condition that includes 90-degree phase difference between the excitation and refocusing pulses, equidistant spacing between two consecutive refocusing pulses, and a constant spin defocusing in each echo spacing; applying oscillating readout gradients with alternating polarities and phase encoding (PE) blips between the readout pulses, inserted between adjacent refocusing pulses and applied to the object to produce gradient echo (GE) and spin echo (SE) MRI signals; and computer-processing the GE and SE MRI signals into images of the object in k-space, including by random encoding comprising randomly designated sampling selected to suppress inter-frame signal variations of the same MRI signals whole maintaining fixed contrast.

BRIEF DESCRIPTION OF THE DRAWINGS

FIG. 1b illustrates conventional random kz sampling and proposed random kz-band sampling with frequency segmentations.

FIG. 6a illustrates GM-specific simulated MTFs, FIG. 6b illustrates corresponding absolute PSFs, and FIG. 6c illustrates its FWHMs for R-GRASE (8 slices), V-GRASE (18 slices), and Accel V-GRASE (24 and 36 slices). These functions show the magnitude of the signal simulated along the partition encoding direction, and the PSFs were normalized to intuitively compare different acquisitions. Compared with R-GRASE and V-GRASE the new Accel V-GRASE results in approximately 3- and 2-fold decrease in FWHM, respectively.

DETAILED DESCRIPTION OF EXAMPLES OF EMBODIMENTS

Pulse Sequence and Measurement Model in GRASE.

GRASE imaging produces gradient echoes (GE) in a constant spacing between two consecutive RF refocused spin echoes (SE). If signal refocusing via stimulated-echo pathways does not contribute to the signal decay with 1800 RF refocusing pulses, the measurement model can be cast as a mixture of multiple signal decays of T2 and T2' weightings in a single TR (41-43):

$$y(m, n) = \int_r dr \cdot \rho(r) e^{-\frac{m}{T_2(r)}} e^{-\frac{|(n-Ny/2)T_{GE}|}{T_2'(r)}} e^{i2\pi k(m,n)\cdot r} \quad [1]$$

where TGE is the gradient echo spacing, m is the time from the excitation pulse, n is the gradient echo index taking values where Ny is the number of phase encodings, and y (m, n) is the acquired signal at the nth gradient echo from time m. Note that both T2 and T2' terms result in a strong signal attenuation, thus causing severe image blurring with long SE and GE spacings while potentially producing double peaks in k-space from signal discrepancies between SE and GE.

Figure 1A:
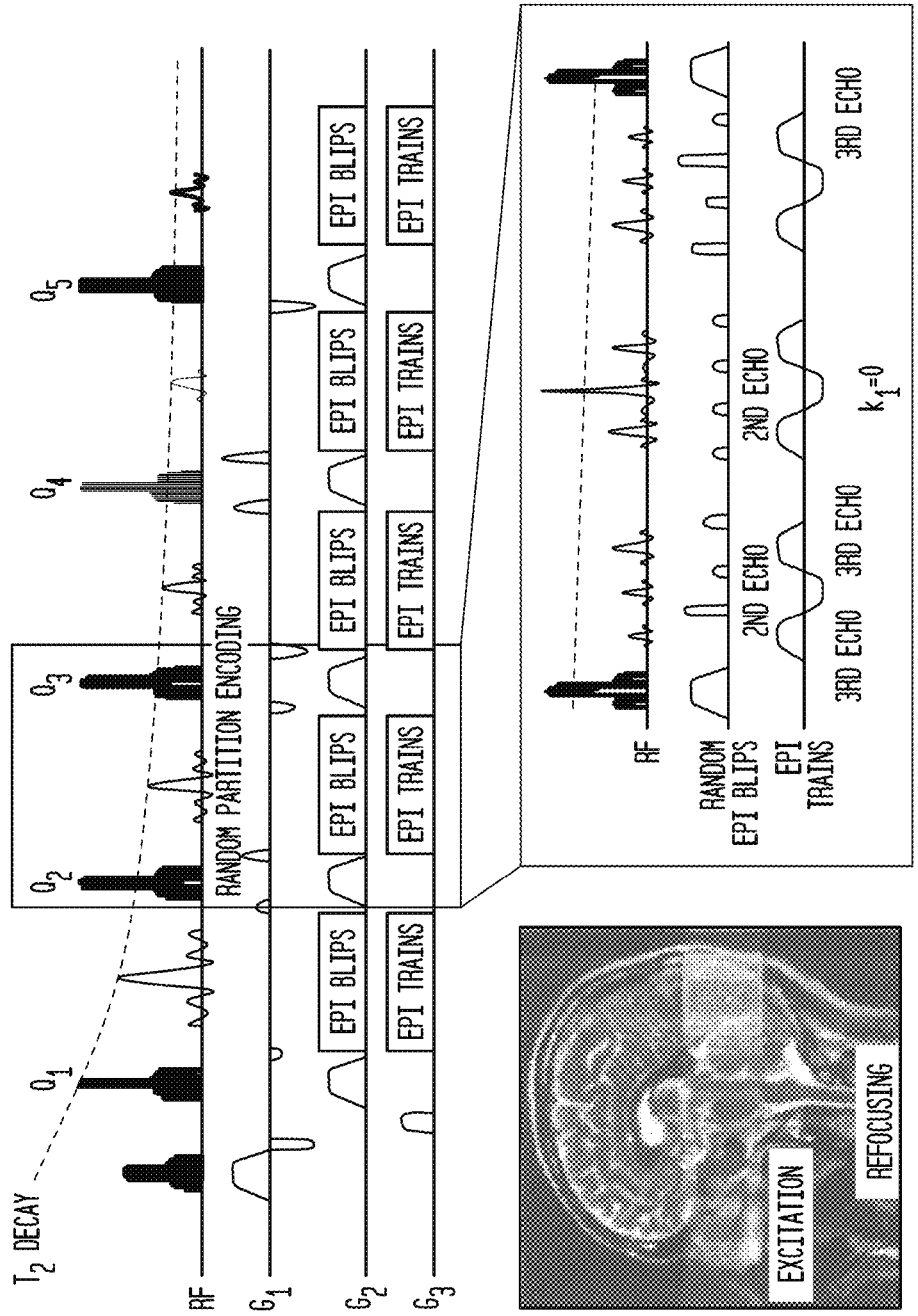
FIG. 1a illustrates a schematic of single-slab 3D GRASE with inner-volume selection.

Accelerated GRASE Acquisition:

A schematic of accelerated GRASE sequence is shown in FIG. 1(a). Spatially slab-selective excitation and refocusing pulses (duration, 2560 μs) are applied with a half the echo spacing (ESP) along orthogonal directions to select a sub-volume of interest at their intersection. Equidistant refocusing RF pulses are then successively applied under the Carr-Purcell-Meiboom-Gil (CPMG) condition that includes 90° phase difference between the excitation and refocusing pulses, an equidistant spacing between two consecutive refocusing pulses, and a constant spin dephasing in each ESP. The EPI train, which accommodates oscillating readout gradients with alternating polarities and PE blips between them, is inserted between two adjacent refocusing pulses to produce GE and SE.

Since an ESP is, if compared to conventional fast spin echo (FSE) sequence, elongated to accommodate the large number of gradient echoes, random encoding for the partition direction may cause large signal variations with a shuffled ordering between the same data across time as illustrated in FIG. 1(b). In addition, asymmetric random encoding between upper and lower k-spaces for phase direction potentially yields contrast changes with varying TEs. To overcome these barriers, a new random encoding scheme can be used that adapts randomly designed sampling to the GRASE acquisition in a way that suppresses inter-frame signal variations of the same data while maintaining fixed contrast.

Figure 1C:
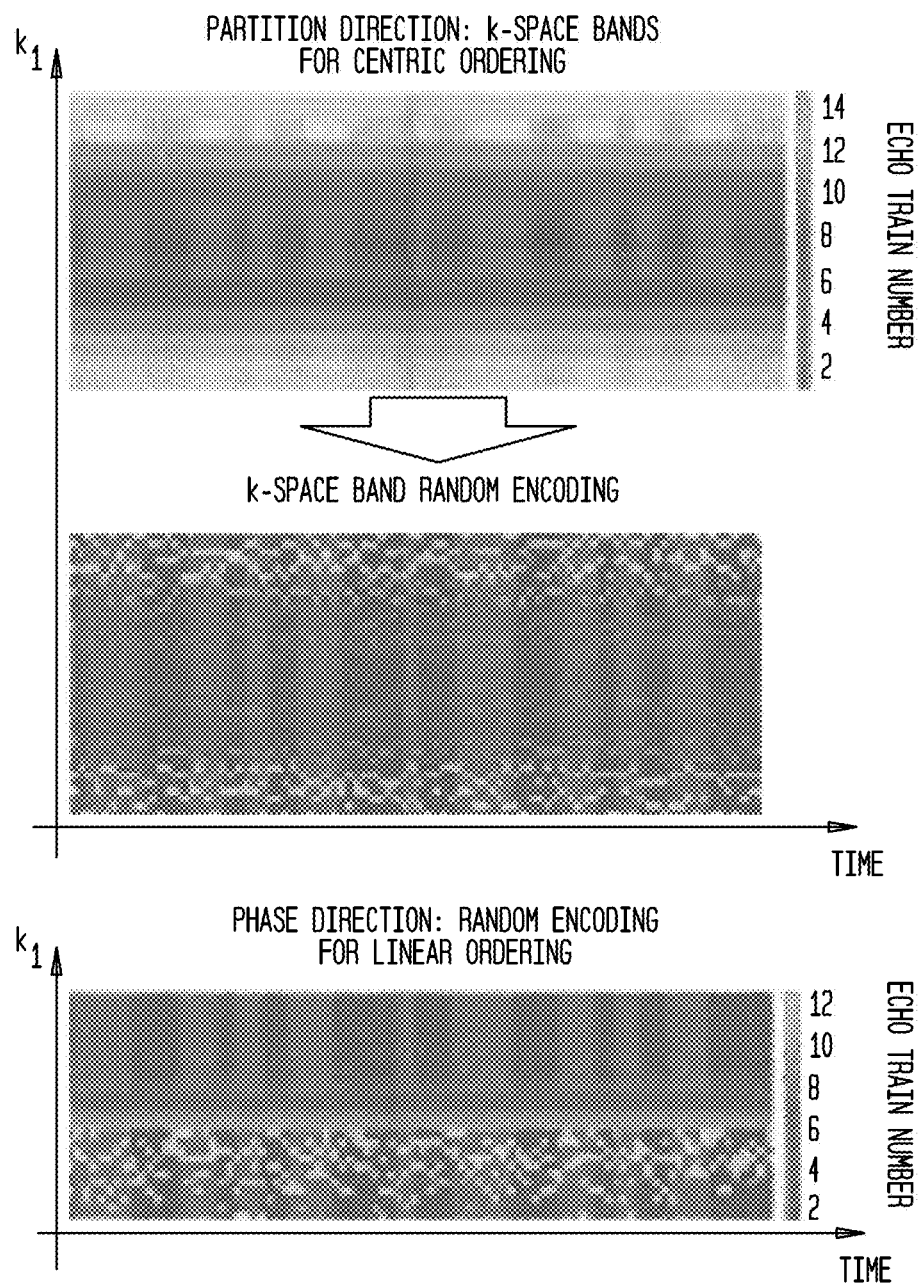
FIG. 1c illustrates view-ordering schemes for partition (SE axis) and phase encodings (EPI axis) where different colors indicate different echo orders along the echo train. The random kz-band sampling suppresses potential inter-frame signal variations of the same data in the partition direction, while the same number of random encoding between upper and lower k-space removes the contrast changes across time.

For partition encoding, a kz-space is segmented as multiple sub-bands by dividing it into several frequency bands according to a probability density function (PDF) 1/wr, where wr is the number of k-space lines in the rth kz-space band defined as: wr=ceil((r+1)/2). In such a setting, the partition encoding pattern is generated by randomly choosing a sample within a single kz-space band sequentially according to a centric reordering. (e.g. 1st band: kz=0 with PDF=1, 2nd band: kz∈ {−2Δkz−Δkz} with PDF=½, . . . , 5th band: kz∈ {3Δkz, 4Δkz, 5Δkz} with PDF=⅓, etc). The last two samples are randomly determined from the rest of the peripheral upper and lower kz-spaces. Given the considerations above, the slice and refocusing pulse numbers are carefully chosen to balance between the center and peripheral samples, potentially yielding a statistical blurring due to an acquisition bias in k-space. For phase encoding, high frequency lines are under-sampled by randomly shifting each sampling point within the maximum distance (Δky, max=4Δky) to samples previously added to the pattern, while fully sampling the central k-space lines. FMRI studies assume that image contrast is invariant over the entire time frames for statistical analyses. However, the random encoding along PE direction might unevenly sample the ky-space data between upper and lower k-spaces with a linear ordering, resulting in undesired contrast changes across time with varying TE. To mitigate the contrast variations, the same number of ky lines between lower and upper k-spaces is acquired for a constant TE across time as shown in FIG. 1(c). The proposed random encoding scheme is summarized in the Appendix at the end of the written description.

Flip Angle Designs:

To control T2 blurring in GRASE, a variable refocusing flip angle (VFA) regime is used in the refocusing RF pulses to achieve slow signal decay during T2 relaxation. The flip angles are calculated using an inverse solution of Bloch equations: based on a tissue-specific prescribed signal evolution (exponential decrease) with relaxation times of interest taken into account. For tissue-specific simulations, T1 and T2 values are assumed to be 1900 ms and 60 ms for gray matter (GM), 1500 ms and 50 ms for white matter (WM), and 4000 ms and 1000 ms for cerebrospinal fluid (CSF) (9). The prescribed signal can be described as:

$$y(m, Ny/2) = \exp\left(-\frac{\beta \cdot m}{T_2}\right).$$

Given β and T2, the Bloch simulations were prospectively performed (44), and the quadratic closed form solution is then applied to estimate the refocusing flip angles as described in (45, 46). The maximum flip angle in the refocusing pulse train is set to be lower than 150° for low energy deposition. The effects of the two imaging parameters (the number of echoes and the prescribed signal shapes) on functional performances that include PSF, tSNR, auto-correlation, and BOLD sensitivity are detailed in the discussion further below of Experimental Studies.

Figure 10A:
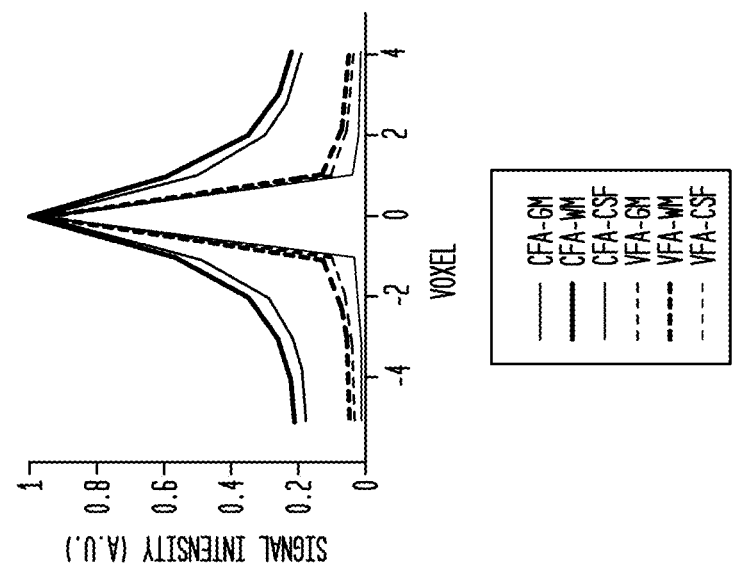
FIG. 10A illustrates VFA along the spin echo train in the new method.
Figure 10B:
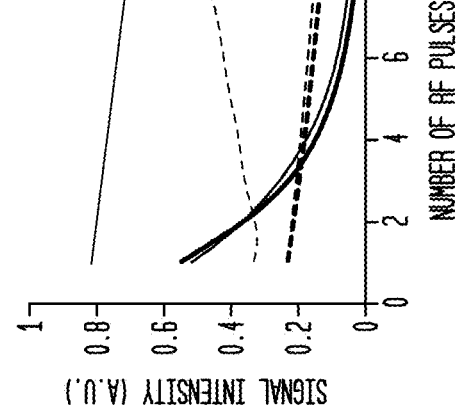
FIGS. 10B and 10C illustrate the corresponding T2 signal decays and point spread functions (PSF) of GM, WM, and CSF compared to the CFA scheme. A pattern of the VFA is that refocusing flip angles drop rapidly from high to low values in the beginning of the echo train, and then gradually increase up to 130o afterward. The CFA scheme leads to significant FWHM discrepancies in PSF between GM, WM, and CSF according to T2 relaxation times, thus potentially impairing the detectability of tissue boundaries. On the other hand, the VFA scheme leads to small signal variations from gradually increasing flip angles, yielding comparable FWHM in PSF between tissues.
Figure 10C:
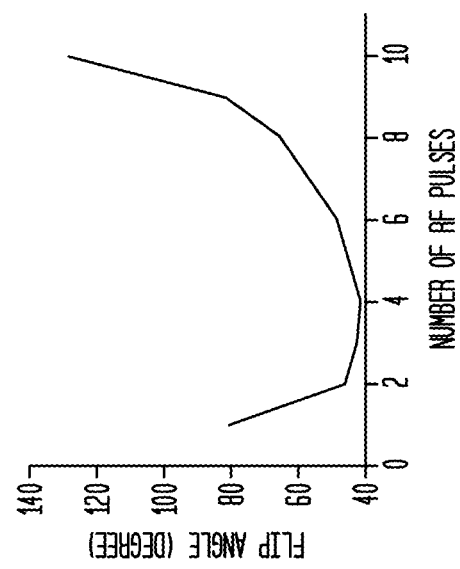

FIGS. 10A-10C demonstrate an example of the resulting VFA and corresponding T2 signal decays (ETL=10, TESP=24 ms, and β=0.4) and point spread functions (PSF) of GM, WM, and CSF, as compared to those obtained from constant flip angle (CFA). The refocusing flip angles rapidly decrease from high to low values in the beginning of the echo train to store the magnetization along the longitudinal direction, and then increase gradually to counteract an inherent signal loss in the later portion of the echo train (FIG. 10A). Both GM and WM signals rapidly decrease while CSF signal decreases slowly along the echo train in the CFA scheme (FIG. 10B), thus leading to significant PSF discrepancies between different brain tissues depending on T2 relaxation times (FIG. 10C). As compared to CFA, the VFA scheme retains a lower signal level during the initial portion of the echo train, but a gradual increase of flip angles leads to small signal variation along the echo train (FIG. 10B), thereby yielding narrower PSFs with similar full width at half maximum (FWHM) for all tissues that experience slow and fast relaxation. With the consideration, refocusing flip angles need to be modulated with increasing ETL to prevent blurring between tissues.

Reconstruction:
Reconstruction Algorithm:

Since time series of fMRI images can be represented as a linear combination of a background brain tissue signals slowly varying across time and a dynamic BOLD signal rapidly changing from stimulus designs, the reconstruction priors for each component is correspondingly different. If the background tissue signal lies in a low dimensional subspace while its residual is sparse in a certain transform domain, the under-sampled fMRI data is reconstructed by combining the aforementioned signal decomposition model with the measurement model in Eq. [1] and then incorporating them into the following constrained optimization problem with low rank and sparsity priors known as k-t RPCA (37-40):

$$\operatorname*{argmin}_{x_\ell, x_s} \lambda_\ell \|C(x_\ell)\|_* + \lambda_s \|\Psi(x_s)\|_1 \ \ s.t. \|y - E(x_\ell + x_s)\|_2^2 < \epsilon \quad [2]$$

where $x\pounds$ and $x_s$ are background and dynamic images, C is the Casorati matrix operator that reshape $x\pounds$ into NxNyNz× Nt matrix, Ψ is the sparsifying transform operator, E is the sensitivity encoding operator that includes information about the coil sensitivity and the undersampled Fourier transform, and $\lambda_s$ and $\lambda\pounds$ are regularization parameters that control the balance of the sparsity and low rank priors, respectively. The constrained optimization problem in Eq. [2] is then solved using alternating minimization method (47).

Sparsifying Transforms:

When employing k-t RPCA model in fMRI studies, the BOLD activation is directly reflected on the sparse component by capturing temporally varying signal changes during the stimulation. A proper choice of the sparsifying transform for temporal sparsity is important for achieving sparse representation with high BOLD sensitivity. When the BOLD signal exhibits periodicity across time, temporal Fourier transform (TFT) can be used for the temporal spectra, in which high energy is concentrated in the region of certain frequency signals. On the other hand, more complicated signals can be captured using data-driven sparsifying transform such as Karhunen-Loeve Transform (KLT) or dictionary learning. For experiments conducted in block-designed fMRI, TFT can be chosen as a temporal sparsifying transform in our implementation.

Experiments:

In accordance with the process described above, MRI studies were conducted on a 7T whole body MR scanner (MAGNETOM 7T, Siemens Medical Solution, Erlangen, Germany) equipped with a 32-channel head coil for a limited coverage of both visual and motor cortex areas. Prior to imaging scan, the RF transmission voltage was adjusted for the region of interest using a B1 mapping sequence provided by the scanner vendor. Institutional review board and informed consent was obtained for all subjects.

Data Acquisition and Reconstruction:

All data were acquired using 1) regular GRASE (R-GRASE), 2) VFA GRASE (V-GRASE), and 3) Accelerated VFA GRASE (Accel V-GRASE), respectively. In all experiments, the spatial and temporal resolutions were set to 0.8 mm isotropic and 3 seconds with 92 and 200 time frames for visual and motor cortex, resulting in total fMRI task durations of 4 min 36 sec and 10 min, respectively. Other imaging parameters for each sequence are summarized in Table 1.

The reconstruction algorithm was implemented offline using the MATLAB software (R2017b; MathWorks, Natick, MA). Coil sensitivity maps were calibrated by averaging under-sampled k-space over time, then dividing each coil image by a root sum of squared magnitudes of all coil images. The regularization parameters $\lambda\pounds$ and $\lambda s$ were set to 1.5×e-5 and 2.5×e-5, respectively, by manually optimizing the values under a wide range of parameters. The low rank and sparse subproblems derived from Eq. [2] were solved by applying a soft thresholding function to singular values and sparse coefficients. The numerical solution was terminated if the stopping criteria was satisfied, i.e., $|x_\ell^{k+1} + x_s^{k+1} - (x_\ell^k + x_s^k)\|_2^2 \le \delta \|x_\ell^k + x_s^k\|_2^2$ or $k \le K_{max}$ where δ and K are the error tolerance and maximum number of iterations. After the reconstruction, low rank and sparse images were combined for functional analysis.

Stimulation Paradigms:

Two sensorimotor stimulation paradigms (1 run each) were utilized to test pulse sequence development. The first paradigm was photic stimulation from a circular, flashing checkerboard. In that paradigm, 9 blocks of 30 second duration each (15 seconds flashing on at 4 hertz, 15 seconds crosshairs for a 30 second cycle) were employed for a total task duration of 4.5 minutes. The second paradigm was a finger tapping motor task previously used to investigate layer specific activation in the primary motor cortex (48). The unilateral task consisted of 10 blocks, each of 60 second duration (30 seconds tapping, 30 seconds crosshair), resulting in a 10-minute acquisition time. Subjects were asked to tap their index finger and thumb with the same pacing as a video clip projected in the scanner bore. Stimuli were presented using PsychoPy software (49) via an angled mirror and SV-6011 projection system (Avotec, Inc. Stuart, FL).

Data Analysis:

The fMRI data was preprocessed and analyzed in a standard manner using the afni proc.py script in AFNI (50).

Preprocessing consisted of: the initial removal of the first 3 TRs to account for magnetic saturation, head motion correction, and no applied blurring. Statistics were modeled in the GLM framework with 2 low frequency polynomial regressors along with 6 head motion regressors of no interest. Regressors of interest were convolved with a double-gamma canonical hemodynamic response function. T-statistics are shown in the figures overlaid on a mean image that was temporally averaged following motion correction. The statistical thresholding was set to p≤0.001, and applied AFNI's ARMA model with the tool 3dREMLfit (51, 52), and a cluster correction (number of contiguous voxels determined separately for each dataset) based on a "mixed ACF" smoothness estimate of the image noise structure with 3dFWHMx and then 3dClustSim (53, 54). tSNR maps were also created as the mean signal divided by the standard deviation of the GLM residuals. Full width half max values were calculated using 3dFWHMx. First-order autocorrelation maps AR(1) were calculated using the detrended residuals of the GLM regression as input. Temporal decomposition analysis was also carried out using Probability Independent Component Analysis (55) as implemented in MELODIC (Multivariate Exploratory Linear Decomposition into Independent Components) version 3.15, part of FSL (56). Component maps were visually inspected to identify the component representing the visual task activation signal based on the time course and power spectrum with peak at 0.033 Hz, corresponding to the frequency of visual stimuli presentation. Preprocessing and GLM analyses were also performed in FSL and results were virtually identical (not shown).

Numerical Simulations:

Numerical simulations of the Bloch equation for the proposed method were performed to determine the following two imaging parameters: $\beta$ and slice number. The optimality criterion is to achieve a high level of SNR with a slight loss of image sharpness from the acquisition side as well as attain a substantial level of incoherence with a large number of slices from the reconstruction side. The simulation parameters that include pulse duration, ETL, and ESP were identical to the acquisition parameters described in Table 1 in the Appendix at the end of this patent specification.

To investigate the effect of B and slice acceleration on GM signals, a PSF was numerically estimated by: 1) describing GM signal evolution across ETL from the calculated VFA, 2) creating modulation transfer function (MTF) by putting the signals onto the k-space grid along the partition direction according to a centric reordering scheme, and 3) generating the PSF by applying an inverse Fourier transform to the resulting MTF. With a range of B from 0.1 to 0.7 and slice number between 12 to 36 slices for ETL=10, contour plots were generated to represent the following: 1) relative SNR (rSNR), which reflect the area under the curve in the MTF penalized by a factor of the square root of the net acceleration:

$$\sqrt{R}\,(957),\ rSNR \propto \frac{1}{\sqrt{R}} \int_{-\infty}^{\infty} MTF(k)dk$$

and 2) incoherence of the PSF induced by under-sampling, which represents a ratio of the main peak to the standard deviation of the pseudo-noise (incoherent aliasing) (58). To assess the PSF, the full width at half maximum (FWHM) was calculated by approximating the shape of the PSFs with a spline interpolation. To avoid signal transition in the first few TRs, all simulations for PSF and MTF were measured after reaching a steady-state.

Experimental Studies:

To investigate the effect of ETL and B on GM tissue signal under different VFA schemes, the signal decays and the corresponding PSFs were numerically estimated with varying $\beta$ (for different level of signal modulation: 0.1, 0.4, and 0.7) and increasing ETL from 10 to 14 (for different number of slices: 24 and 36 slices) to compare with the CFA scheme. Four sets of visual cortex data for the different number of slices were then acquired with the same imaging parameters as the simulation.

To evaluate the performance of Accel V-GRASE (for 24 and 36 slices) against R-GRASE and V-GRASE, four sets of the visual cortex data were acquired in a volunteer and then reconstructed using: 1) zero-filled inverse Fourier transformation for partial Fourier acquisitions and 2) k-t RPCA with TFT for random under-sampled acquisitions. Finally, the proposed method was additionally examined in the region of primary motor cortex for comparisons with the above methods.

Figure 2A:
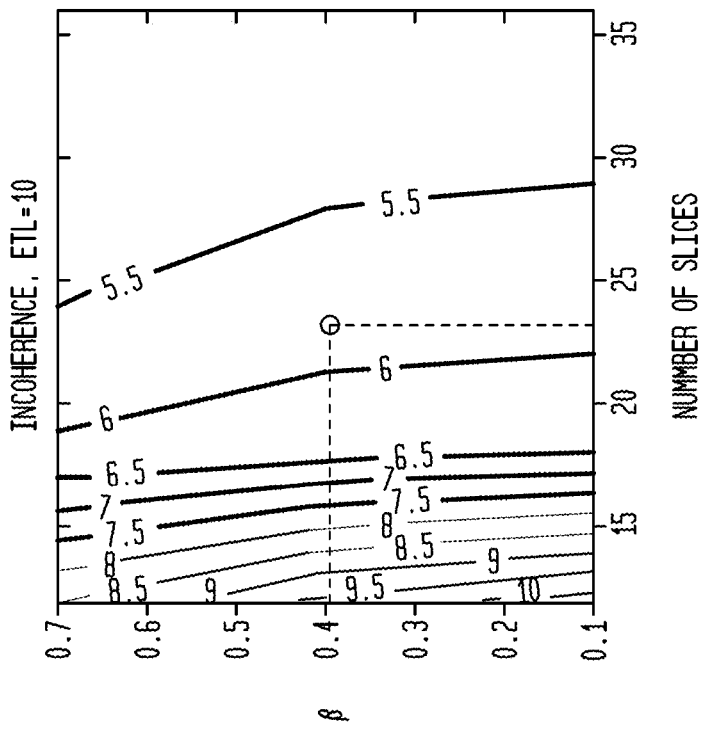
FIG. 2a illustrates contour plots of relative SNR and FIG. 2b illustrates incoherence with varying β (0.1-0.7) and slice numbers (12-36) for ETL=10. Solid circles represent the imaging parameters chosen for experimental studies in this work (β=0.4 and slice number=24). The imaging parameters of β and slice number are optimally chosen that balances between rSNR (for acquisition) and incoherence (for reconstruction).
Figure 2B:
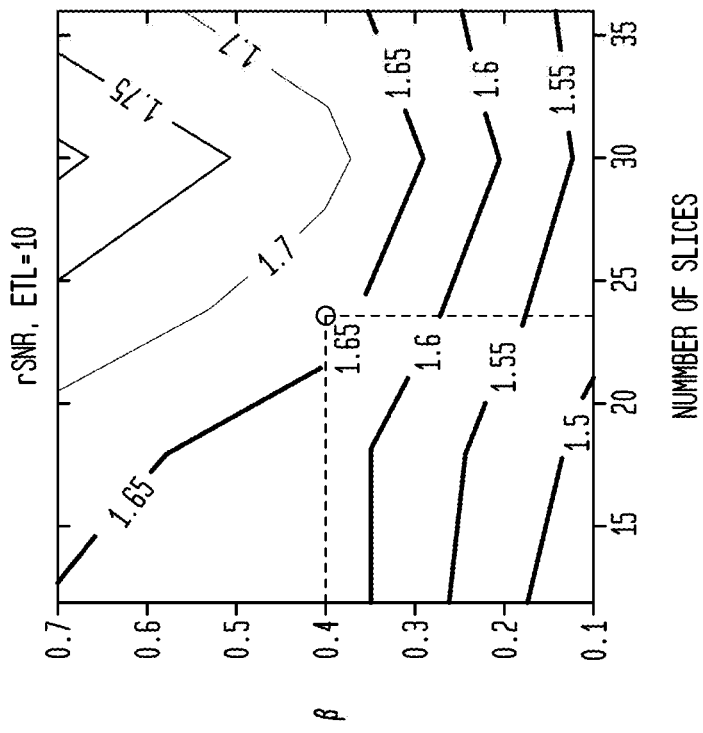

Results:

Numerical Simulations:

FIGS. 2a and 2b represent contour plots of rSNR and incoherence for ETL=10 with increasing $\beta$ (0.1-0.7) and slice number (12-36 slices), respectively. As the number of slices increases, the rSNR increases, reaches a maximum around 30 slices, then decreases due to $\sqrt{R}$ penalty, while the level of the incoherence in the PSF decreases, implying that high acceleration potentially has strong coherent side lobes. When the slice number is held constant, rSNR gradually fall with decreasing $\beta$ because refocusing flip angles remain relatively low over the entire echo train to flatten out the signal decay, while increasing the incoherence by suppressing side lobe energy. Since both contours exhibit distinct directionalities, $\beta$ and slice number were set to 0.4 and 24 at ETL=10 in comparisons with current state-of-the-art techniques to compromise between rSNR and incoherence.

Figure 3A:
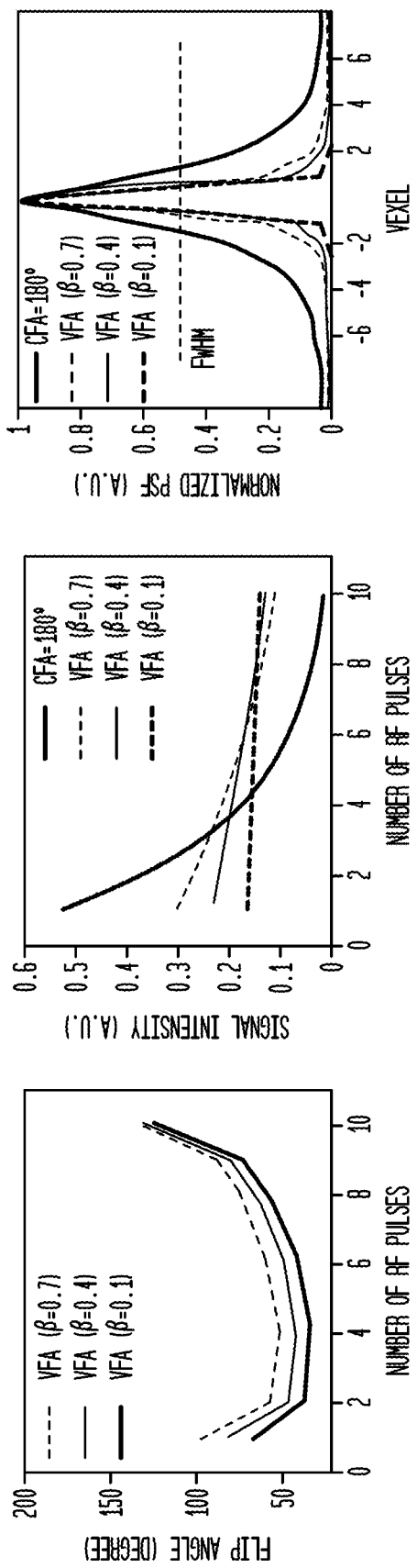
FIG. 3a illustrates the effect of β on VFAs, GM signal decays, and PSFs for 24 slices with ETL=10 and FIG. 3b illustrated the effect for 36 slices with ETL=14. Refocusing flip angles are calculated based on exponential prescribed signal evolution with varying β for GM, leading to reduced signal modulation across ETL. The resulting PSFs are normalized to have a maximum absolute value of 1. Compared to the CFA scheme, the VFA schemes result in 2-fold and 3-fold decreases in FWHM for 24 and 36 slices, while yielding comparable FWHMs with varying β.
Figure 3B:
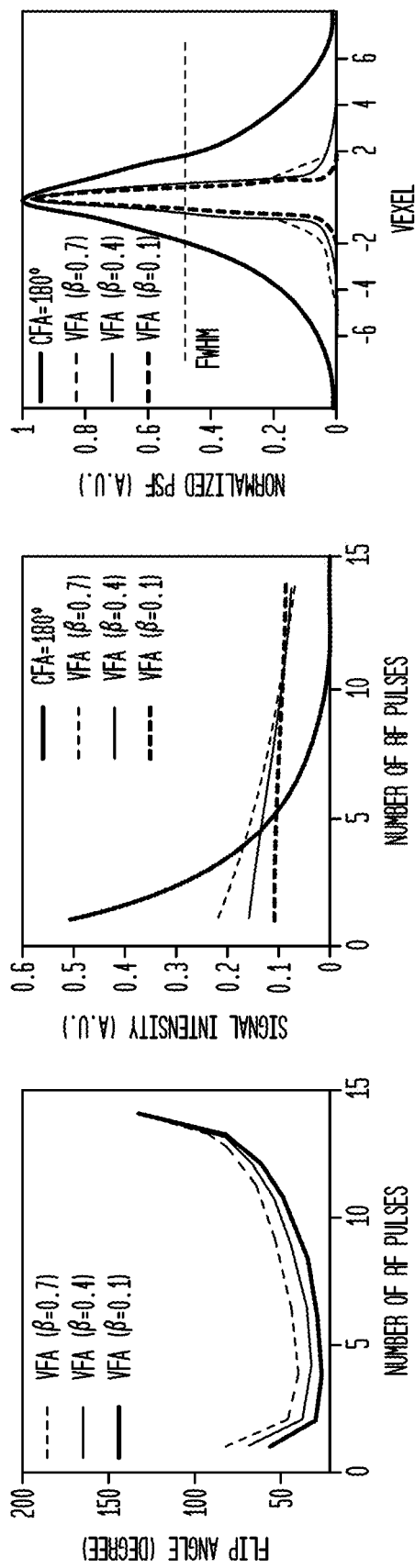

FIGS. 3(a) and 3(b) demonstrate the VFA schemes, GM signal decays, PSFs, and its FWHMs with increasing $\beta$(=0.1, 0.4, and 0.7) for 24 (ETL=10) and 36 (ETL=14) slices. Unlike the CFA scheme that produces rapid signal drop, the VFA schemes gradually mitigate the signal decays toward the end of the echo train with decreasing $\beta$, thus yielding narrower PSFs than that of the CFA scheme. The FWHM of the PSFs with VFA scheme does not vary much among different slice numbers, ranging from 1.09 to 1.17 for 24 slices and from 1.18 to 1.25 for 36 slices. Thus, the VFA schemes yield approximately 2-fold and 3-fold as small FWHM as those with CFA scheme for 24 and 36 slices.

Figure 4:
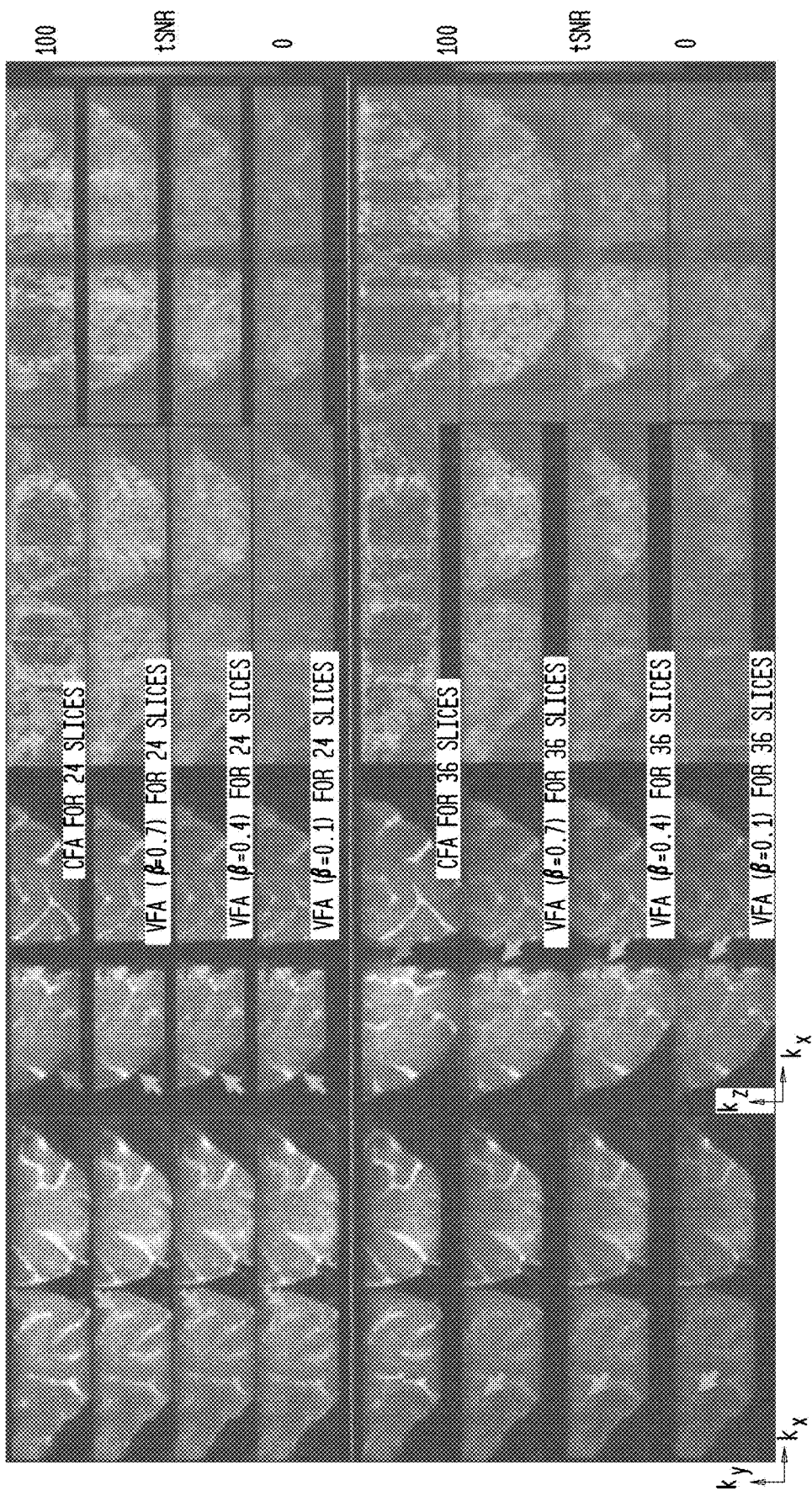
FIG. 4 illustrates representative single-frame magnitude images and tSNR maps in both axial plane and coronal planes for 24 (upper) and 36 (bottom) slices. The VFA, compared to the CFA, yields higher spatial resolution particularly in the coronal through slice direction at the cost of tSNR with increasing β.

Experimental Studies:

FIG. 4(a) shows an example of magnitude images reconstructed using k-t RPCA. Consistent with the above simulation, the CFA scheme produces severe blurring in both the axial and coronal images (red arrows), whereas the VFA scheme yields improved spatial resolution (yellow arrows) at the expense of SNR. FIG. 4(b) show the corresponding tSNR. As expected, tSNR values significantly decrease with decreasing $\beta$ values. The tSNR loss is not spatially uniform with a more pronounced decrease for right side of the primary visual cortex.

Figure 5A:
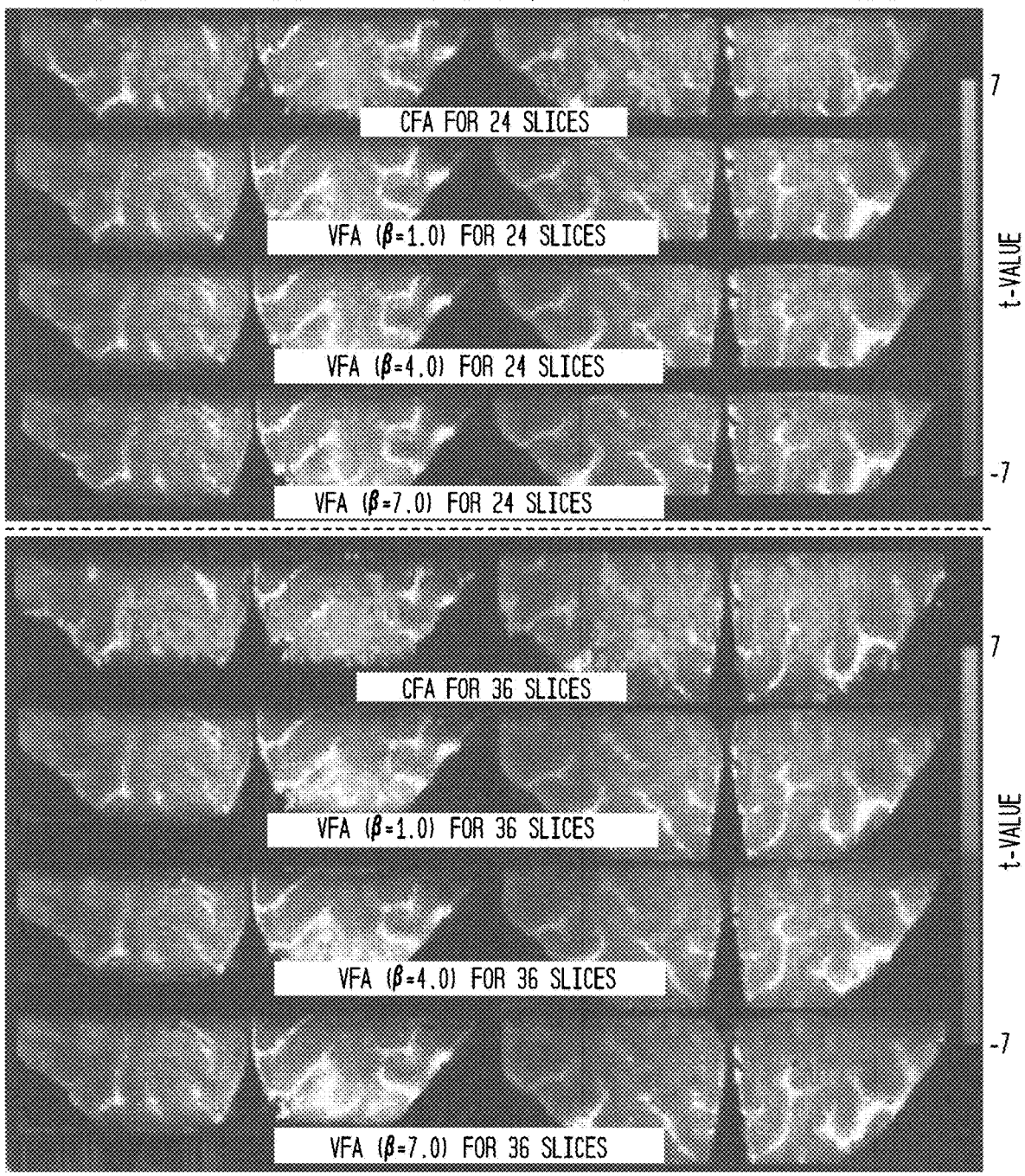
FIG. 5a illustrates visual activation maps (t-score, p≤0.001) overlaid on the average GRASE images.
Figure 5B:
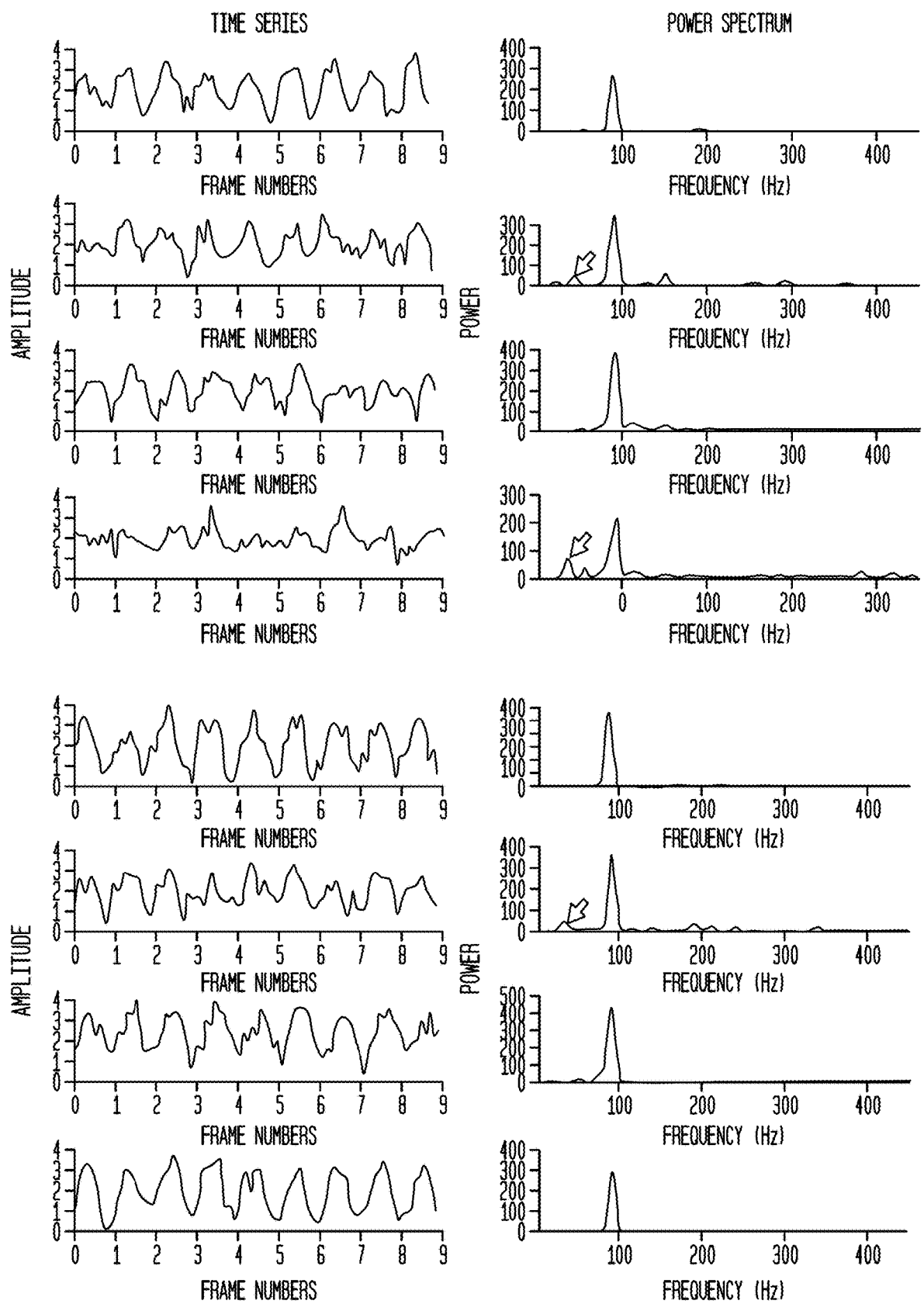
FIG. 5b illustrates corresponding examples of time courses and power spectrums in the associated ICA component. The effect of image blurring in the CFA limits the spatial specificity while the improved sharpness in the VFA achieves high spatial specificity at the expense of sensitivity with β=0.7, and then substantially decreases in sensitivity with β=0.4 and 0.1. Time courses and power spectrums demonstrate the highest peak at 0.033 Hz corresponding to the stimulus frequency, but with decreasing β to 0.1 for 24 slices the ICA component shows low temporal fidelity in the time course with multiple peaks in the power spectrum due to low tSNR.

FIG. 5(a) shows examples of visual paradigm activations in the occipital lobe overlaid on the average GRASE images from which they are derived, for different $\beta$ values (B=0.1, 0.4, and 0.7). The CFA schemes introduce a smearing of BOLD information across neighboring tissues particularly in the coronal plane. As compared to the CFA scheme, the VFA improves spatial specificity at the cost of BOLD sensitivity, and may have obscured the activated voxels with decreasing β values, leading to a relative underestimation of its performance. FIG. 5(b) shows associated time courses and power spectrum of ICA signal component results. Each time series captures periodic BOLD signal that bears a strong resemblance to the design's 9 blocks. Accordingly, the power spectrum of the associated time courses has highest peak at 0.033 Hz corresponding to the stimulus frequency although there are some large peaks around 0.1 Hz that may come from aliased physiological noises such as cardiac pulsation and respiration (red arrows). However, the ICA signal component for low β=0.1 and 24 slices, as compared to stimulus timing, yields low temporal fidelity in the time course while producing multiple peaks in the power spectrums due to low BOLD sensitivity, although the dynamic features are generally shared between CFA and VFA (β=0.4 and 0.7).

FIGS. 6a-6c show the simulated through-plane MTFs, corresponding absolute PSFs, and FWHMs for R-GRASE (8 slices), V-GRASE (18 slices), and Accel V-GRASE (24 and 36 slices at β=0.4 and 0.7, respectively) acquisitions. Both R-GRASE and V-GRASE produce a rapid MTF drop due to the lengthened echo spacing (ESP=38 ms), yielding 3.45 and 2.32 FWHM PSFs. On the other hand, Accel V-GRASE with 24 and 36 slices retain higher MTF values over the entire partition direction, resulting in approximately three times and twice as low FWHM (=1.10 and 1.25) as those with R-GRASE and V-GRASE.

Figure 7:
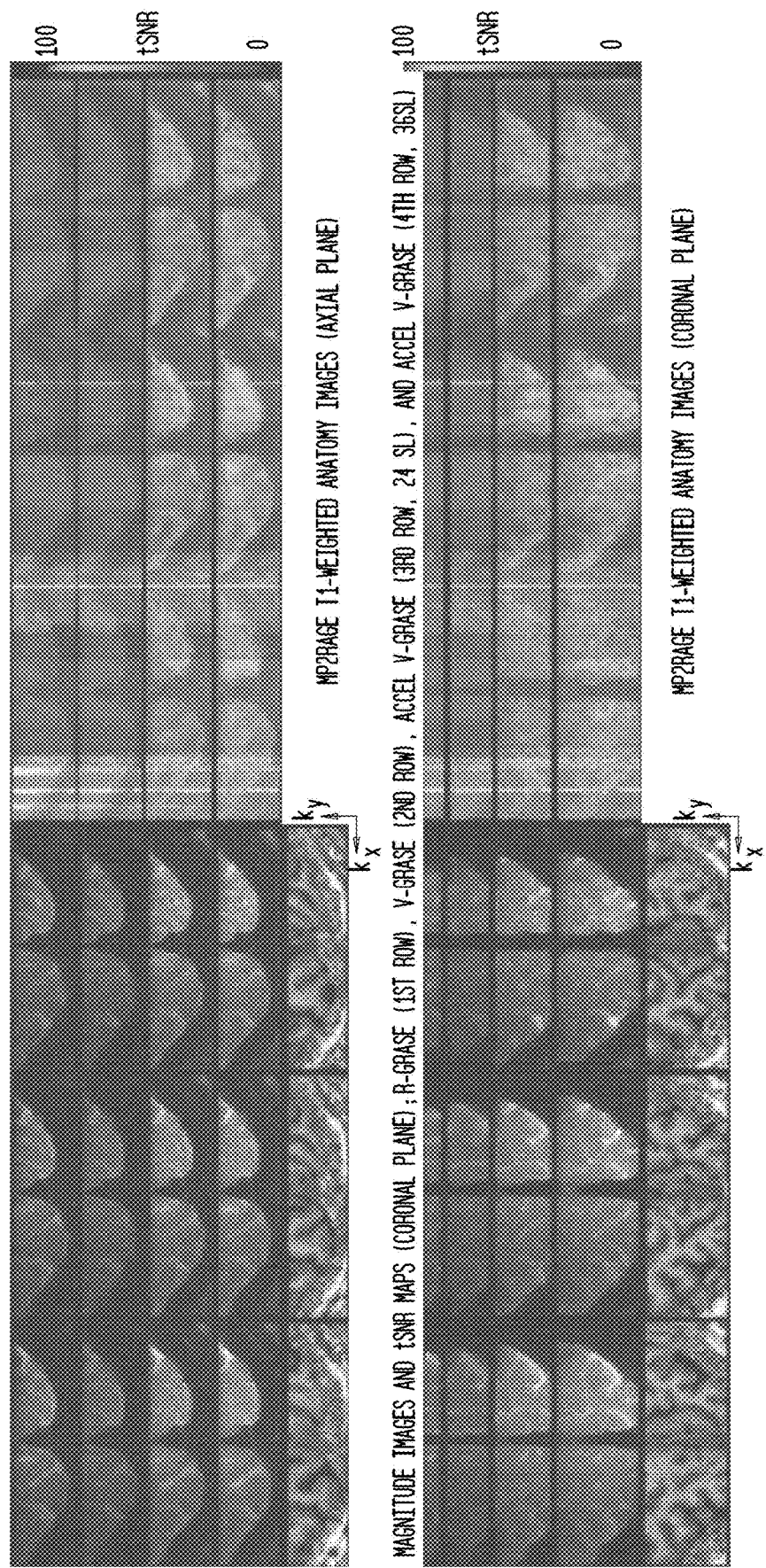
FIG. 7 illustrates comparisons of representative single-frame magnitude images and tSNR maps in primary visual cortex observed from both axial (top) and coronal (bottom) views. From top to bottom, each row represents R-GRASE (8 slices), V-GRASE (18 slices), Accel V-GRASE (24 and 36 slices), and MP2RAGE T1-weighted anatomy im-ages. It can be seen that R- and V-GRASE are unable to resolve tissue boundaries due to image blurring particularly in the coronal plane. While the new Accel V-GRASE exhibits some improvement in term of image sharpness, its superiority is clearly demonstrated for tSNR, as Accel V-GRASE provides better results that balance between image sharpness and tSNR.

FIG. 7 shows magnitude images and tSNR maps consistent with the above simulations. R-GRASE results in substantial blurring in the coronal plane, while V-GRASE yields severe noise amplification and the correspondingly lower tSNR at the cost of im-age blurring. Nevertheless, the proposed Accel V-GRASE further raises the image sharpness while lowering the amplified noises, yielding high tSNR images by mini-mizing a trade-off between image blurring and noise. Compared with R-GRASE and V-GRASE, the proposed methods results in approximately 2 to 3-fold increase in mean tSNR.

Figure 8B:
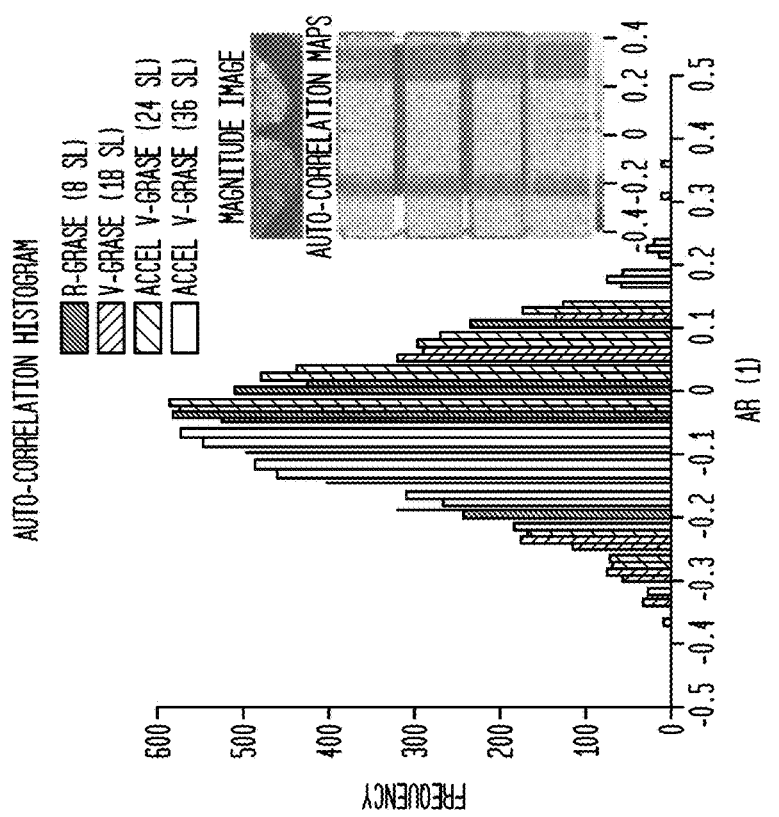
FIG. 8b illustrates temporal autocorrelation histogram and its corresponding spatial maps. Because the ground-truth activations are not available for the in vivo experiment, additional active voxels could be false positive signal or improved sensitivity due to SNR increase. Thus, autocorrelation values are provided to ensure that each time frame data is independent across time even with temporal regularization. The new method has significantly higher t-values while yielding comparable AR(1) values to R-GRASE and V-GRASE without temporal regularization.
Figure 8A:
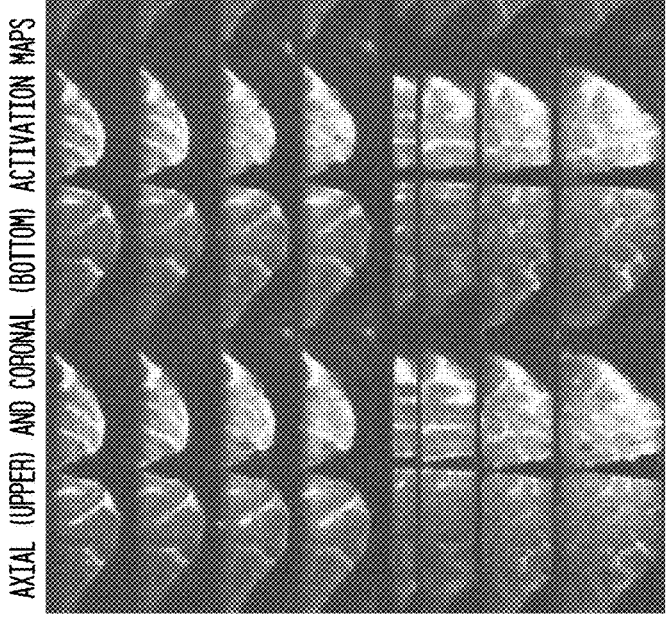
FIG. 8a illustrates visual activation maps (t-score, p≤0.001) overlaid on the average GRASE images observed from both axial and coronal views.

FIG. 8(a) shows functional activation maps for each sequence. The new method described in this patent specification shows much higher sensitivity in the primary visual area, showing better BOLD activations in the vicinity of GM as compared to R-GRASE and V-GRASE. To ensure that the activation in the new method is not biased by temporal regularization, FIG. 8(b) shows a histogram of temporal autocorrelation values AR(1) for each acquisition, in which autocorrelation maps indicate the temporal independence of consecutive time frames and should be ideally flat and low. The new method with 24 and 36 slices shows AR(1) distributions comparable to V-GRASE, while R-GRASE is slightly biased towards positive values.

Figure 9:
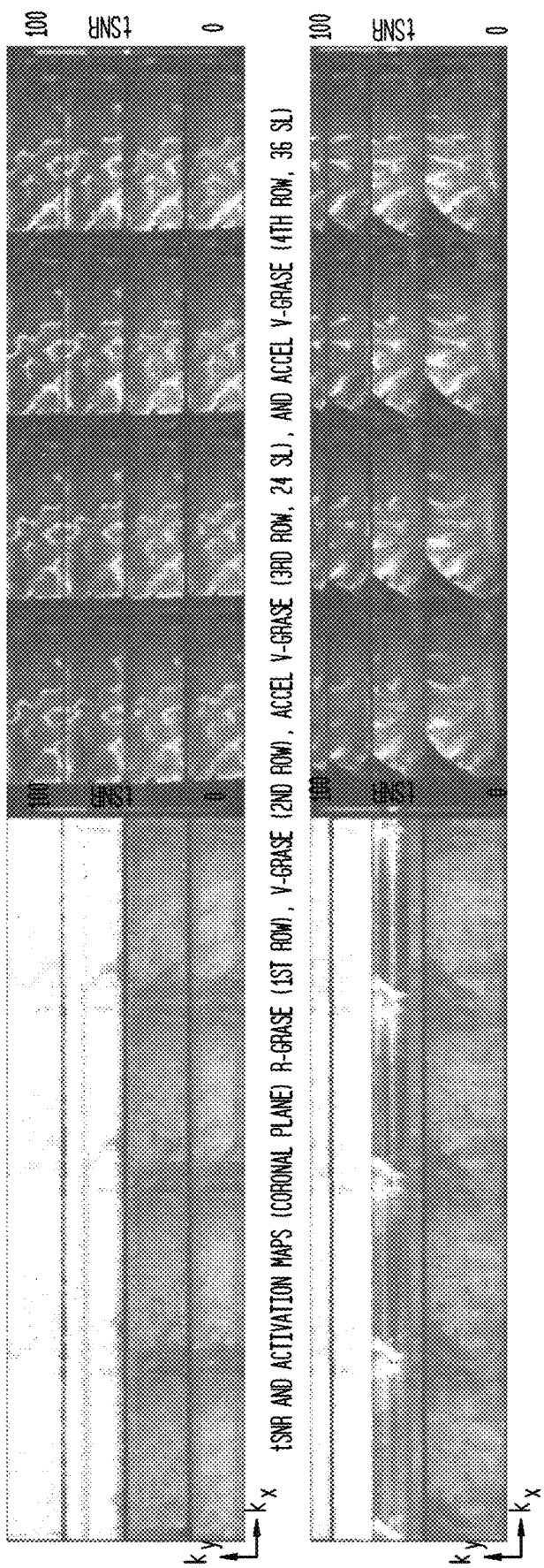
FIG. 9 illustrates comparisons of tSNR and activation maps (t-score, p≤0.001) in primary motor cortex observed from both axial and coronal views. From top to bottom, each row represents: R-GRASE (8 slices), V-GRASE (18 slices), and Accel V-GRASE (24 and 36 slices). There is a striking increase in both tSNR and activation maps with Accel V-GRASE acquisition, in agreement with previous observation in primary visual cortex, although chemical shift artifacts can become pronounced with the increased spatial coverage in the lower part of the coronal plane.
Figure 11:
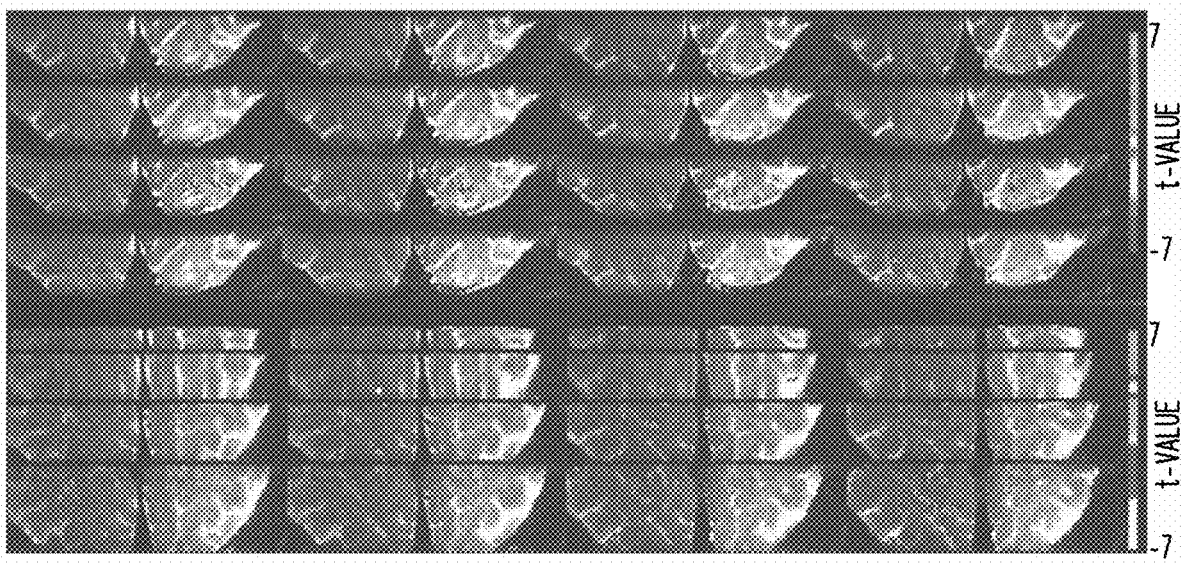
FIG. 11 illustrates activation maps (t-score, p≤0.001) in both visual (Upper) and motor (Bottom) cortex from a different data set of the healthy subject in response to either a circular, flashing checkerboard stimulus or finger tapping task. From top to bottom, each row represents R-GRASE (8 slices), V-GRASE (18 slices), and Accel V-GRASE (24 and 36 slices) observed from both axial and coronal views. Consistent with the previous results shown in FIGS. 8 and 9, Accel V-GRASE yields higher BOLD sensitivity in expected cortical GM areas with larger spatial coverage than R- and V-GRASE.
Figure 11:
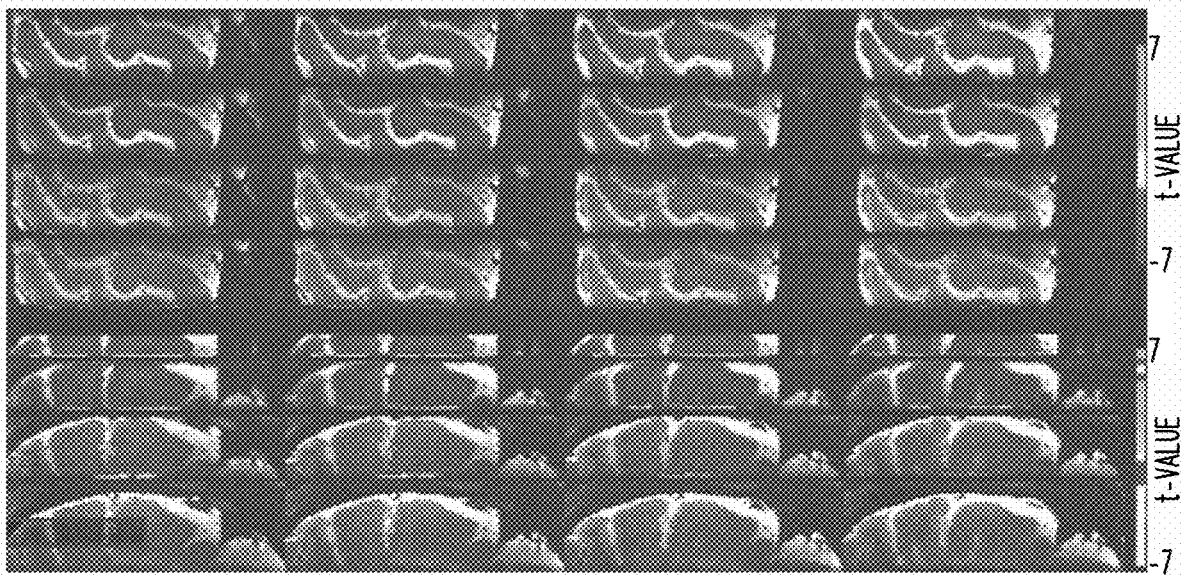

FIG. 9 shows tSNR and activation maps of primary motor cortex during finger tapping. Consistent with the results shown in the visual cortex, the new method outperforms R-GRASE and V-GRASE in improving temporal stability of the fMRI signal while providing stronger activation in expected cortical GM regions. However, that increased spatial coverage introduces chemical-shift artifacts from scalp in the lower part of the coronal plane, discussed in more detail below. The new method was additionally evaluated on both visual and motor cortex from a different data set of the healthy subject as shown in FIG. 11.

Discussion:

The feasibility of accelerated GRASE with controlled T2 blurring in measuring functional activation with larger spatial coverage was demonstrated. Unlike R-GRASE and V-GRASE methods that balance a tradeoff between tSNR, image sharpness, and spatial coverage, the new method described in this patent specification reduces or minimizes these dependencies without an apparent loss of information. Numerical and experimental studies confirm three advantages of the synergetic combination of the optimized acquisition and constrained reconstruction: 1) partition random encoding with VFA increases slice number and narrows the point spread functions, 2) reduced TE from phase random encoding provides a high SNR efficiency, and 3) the reduced blurring and higher tSNR result in higher BOLD activations.

Reducing the tissue blurring is different from the spatial specificity of T2-weighted BOLD contrast map in that VFAs yield high spatial resolution along the partition encoding direction by keeping the spin population comparable across refocusing pulse train, while it achieves pure T2 weighting only in the first refocused spin echo followed by T1-T2 mixed weighting from the second refocusing pulse along the stimulated echo pathway, in which pure T2-weighting rapidly decreases in the beginning of the echo train, whereas T1-T2 mixed weighting rapidly increases and then gradually decreases across refocusing pulse train. Thus, the presence of stimulated echo contribution in the new method increases the BOLD sensitivity by more efficient dynamic averaging of spins due to strong diffusion effect across refocusing pulse train than SE-EPI that lengthens TE at the expense of SNR, while becoming worse in terms of specificity to capillaries (20). This work calculated VFAs based on GM signal decay to reduce image blurring, but it may still be challenging in achieving pure T2-weighting with sufficient SNR. The flip angle design that balances between image blurring and pure T2 weighting could further help improve spatial specificity in the BOLD contrast map at the cost of image blurring.

The work described in this patent specification demonstrates BOLD activation patterns in VFA based GRASE acquisition according to a level of blurring by changing β value. As shown in FIGS. 3a and 3b, T2 signal decay was mitigated by using the VFA approach in the refocusing pulse train. This demonstrates that the first refocusing pulse, corresponding to the center of k-space in the centric ordering, should be lower as the signal decay is further reduced with increasing ETL, potentially leading to tSNR loss. The limited detectability of the activation in the VFA scheme may be attributed to its intrinsically low SNR attainable in a given signal decay with β=0.1. In this regard, VFA based GRASE acquisition tries to optimally balance signal blurring and SNR efficiency. The accelerated V-GRASE can be interpreted as a completely generalized and extended version of V-GRASE in that the former combined variable flip angles (to control spin population) with bi-directional random encoding (to shorten spin echo spacing) resulting in significantly reduced T2 blurring, while the latter utilized variable flip angles only leading to moderate T2 blurring compared to R-GRASE. Inherited from V-GRASE, the tSNR in accelerated V-GRASE depends on the calculated flip angle in the central kz-space, which are more susceptible to B1 inhomogeneity like FIG. 2 in (19), thus substantially lowering the tSNR values in the low excitation area.

An exponential function such as Gaussian distribution has been commonly used as a probability density function for random sampling (34), wherein sampling density is exponentially decreased according to the power of distance from the origin of k-space by reflecting the k-space characteristics. However, the exponential scheme potentially suffers from signal bias toward more densely sampled low frequency component relative to high frequency component and will result in a blurring of activation in addition to the signal modulation along the partition direction. Therefore, the new method described in this patent specification can use an inversely proportional PDF (1/w) to mitigate the potential issue by ensuring a balance between low and high frequency components, which improves or optimizes the performance of accelerated fMRI reconstruction by enhancing the detectability of the functional signals at the cost of SNR.

Figure 12:
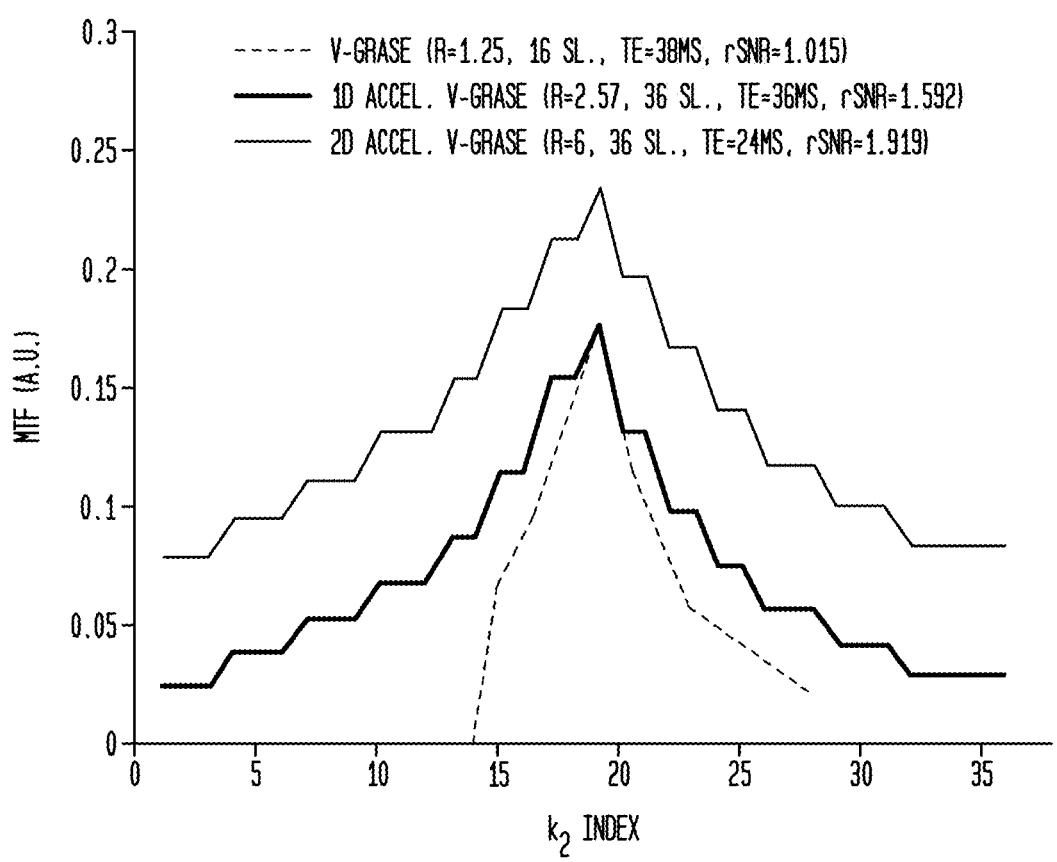
FIG. 12 illustrates the effect of the accelerated GRASE acquisitions on relative SNR for the VFA scheme with ETL=14. Three MTFs were generated by changing the slice numbers (slice acceleration) and effective TE (inplane acceleration), respectively: V-GRASE with 18 slices and 38 ms, 2) 1D Accel V-GRASE with 36 slices and 38 ms, and 3) 2D Accel V-GRASE with 36 slices and 24 ms. 1D Accel V-GRASE results in 0.577 increase in rSNR as compared to VFA GRASE, while 2D Accel V-GRASE further enhances the rSNR by 0.904 despite the increase of net acceleration.

If the noise is identically distributed for all datasets while the frequency spectrum is uniformly distributed, achievable SNR in each volume is linearly proportional to the area under the curve in the MTF at the cost of $\sqrt{R}$ penalty (57). To evaluate the effectiveness of the slice number and effective TE in the new method on relative SNR, three MTFs were generated by accelerating through plane (for increased slice number) and in-plane (for decreased effective TE) directions with the same ETL and VFA: 1) V-GRASE with 18 slices and 38 ms, 2) 1D Accel V-GRASE with 36 slices and 38 ms, and 3) 2D Accel V-GRASE with 36 slices and 24 ms. Compared to V-GRASE, 1D acceleration results in 0.577 increases in rSNR due to larger volume excitation, while 2D acceleration yields 0.904 increase in rSNR due to a reduced TE from phase under-sampling, respectively (FIG. 12). It is additionally observed in FIG. 7 that Accel V-GRASE, as compared to R-GRASE and V-GRASE, can substantially improve tSNR by considerably reducing TE, increasing volume coverage, and stretching ETL duration even though the center of k-space is acquired using a lower flip angle.

EPI random blipped gradient encoding was employed to generate incoherent aliasing artifacts across the PE direction with the following two compartments: 1) full sampling with a regular blip in the central k-space and 2) under-sampling with random blips in the peripheral k-space. However, changing the EPI gradient blips between adjacent PE lines can potentially result in eddy current and concomitant gradient fields due to rapid switching of gradients, which can be difficult to correct using the standard EPI corrections. To alleviate these phase errors, additional phase correction approaches prior to reconstruction can be further applied by either adjusting gradient blip in the hardware or adding an appropriate phase shift term to the acquired data.

Figure 13:
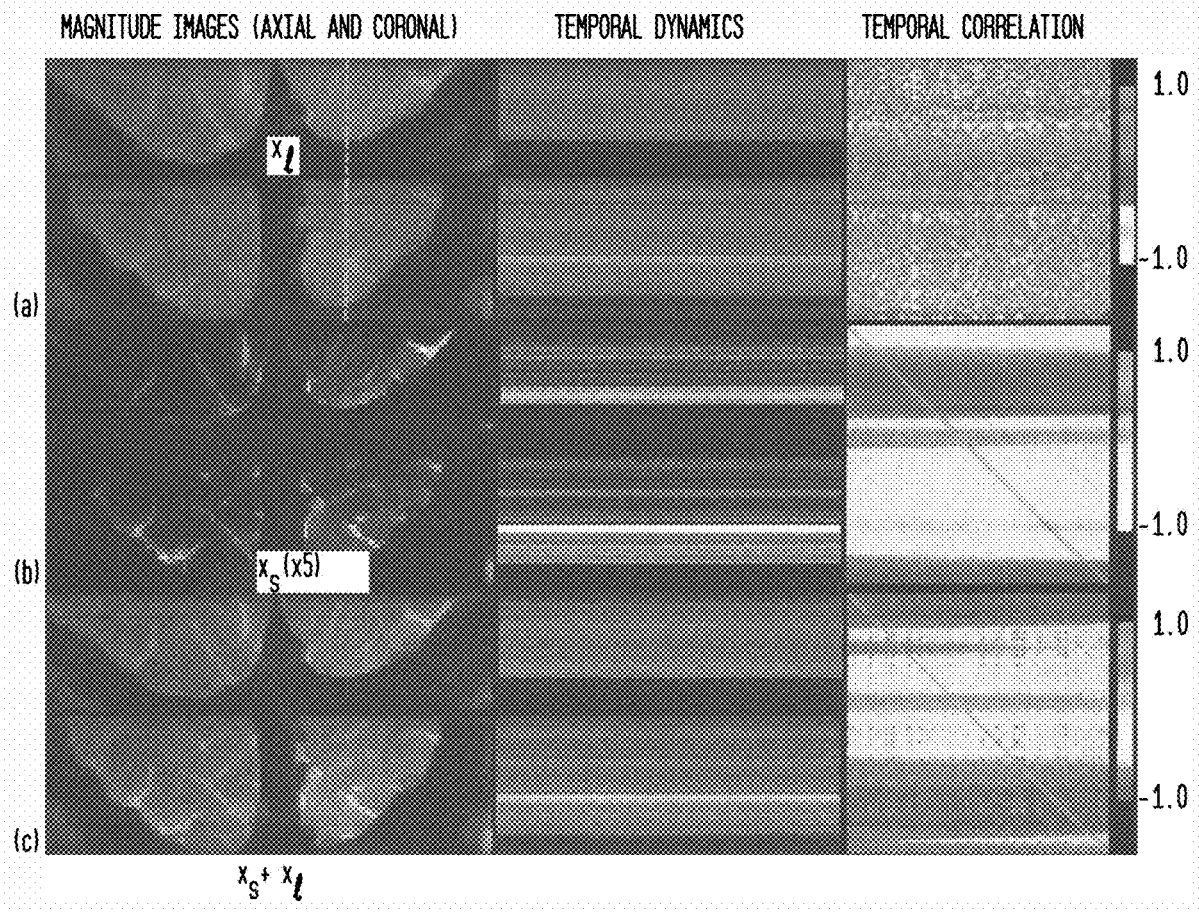
FIG. 13 illustrates low rank and sparse decomposition with its temporal correlations. The low rank component captures slowly varying brain background with a similar variance over time while the residual sparse component detects more rapidly changing dynamic information. The low rank component exhibits significant correlation across time but the sparse component is less correlated by forcing off-diagonal elements to zeros, which results in a weak correlation between time frames in the sum of low rank and sparse components.

A potential issue in the new method is temporal noise correlations introduced by nonlinear temporal regularization resulting in biased statistics, impairing the accuracy of activation detection. Thus, it is desirable to select advanced analysis approaches such as restricted maximum likelihood (ReML) (59, 60) while correcting the autocorrelation model. L+S reconstruction takes advantage of low rank prior as the de-correlator by separating the correlated information from the fMRI images (FIG. 13, label (a)). Hence, the residual sparsity tends to capture temporally uncorrelated and independent information (FIG. 13, label (b)), which can result in a weak correlation between time frames in the sum of L+S (FIG. 13, label (c)) comparable to those of R-GRASE and V-GRASE (FIG. 8b), thereby yielding subtle difference between GLM and ReML analyses at the repetition time employed (data not shown). From this perspective, early works of L+S reconstruction in accelerated fMRI (37, 40) reveal that low rank and sparsity priors play a complementary role to each other, which can lead to improved performance over a single prior, although the incoherence issue between low rank and sparsity can still remain an issue.

Figure 14:
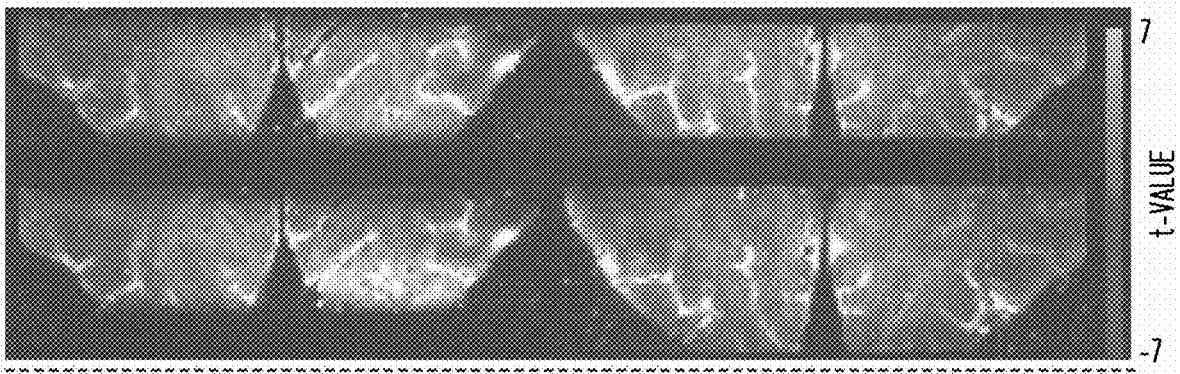
FIG. 14 illustrates visual activation maps (t-score, $p \leq 0.001$, uncorrected) generated using different sparsifying transforms: temporal Fourier transform as a pre-defined model (TFT, Upper) and Karhunen-Loeve transform as a data-driven model (KLT, Bottom). The KLT reconstruction provides better activity localization by suppressing noise-like spuriously activated voxels particularly in the background noise areas, while the TFT reconstruction has a higher maximum t-value in this fMRI experiment.
Figure 14:
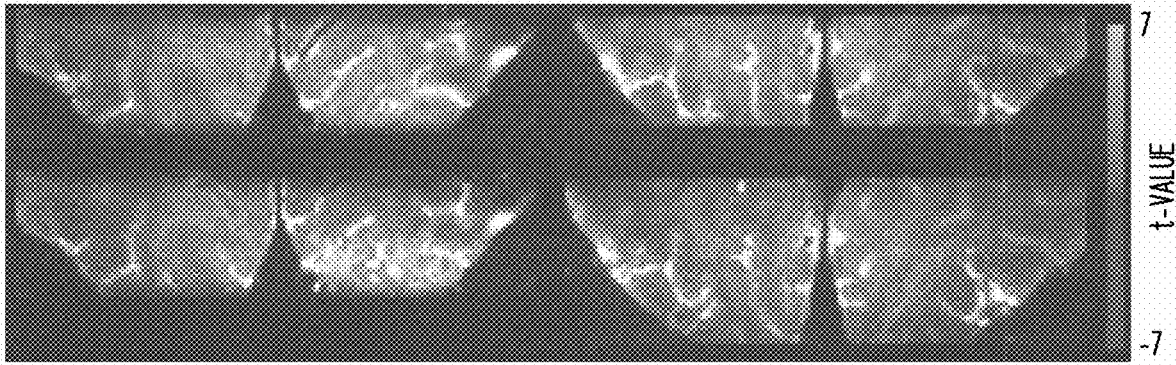

Since activation patterns can be differently characterized according to the sparsifying transforms, selection of an optimal sparsifying transform can be a key in the success of CS fMRI study. With the consideration, Zong et al (34) reconstructed fMRI images with two different sparsifying transforms: temporal Fourier transform (TFT) as a pre-defined model and Karhunen-Loeve Transform (KLT) as a data-driven model. To clearly visualize the difference between the two different sparsifying transforms, the activation maps can be made using a standard GLM analysis alone. Consistent with the results from (34), in this work the KLT reconstruction significantly reduces the number of spuriously activated voxels, while TFT reconstruction has a higher maximum t-value just in case of block-designed fMRI study as shown in FIG. 14. Therefore, the combination of both TFT and KLT in CS fMRI study can help achieve improved sensitivity with the reduced number of spuriously false activation voxels. However, since functional activation patterns dominantly rely on stimulation designs, it may be potentially more complicated with either jittered or randomized stimuli timings, thus requiring feature-optimized sparse representation in the temporal transform domain. This patent specification refers to block-designed fMRI experiments, the TFT and KLT reconstruction used for temporal regularization may have some loss of functional features in fast, event-related fMRI experiments, and the strict analysis with the limiting factors of experimental designs and sparsity priors could suggest further experimentation.

Low rank and sparsity priors of the k-t RPCA reconstruction characterize fMRI signal features, so consideration of noise models can be important. Physiological noises, including cardio-respiratory processes, give rise to periodic signal fluctuation with a high degree of temporal correlation, while thermal noises, derived from electrical losses in the tissue as well as in the RF detector, are spatially and temporally uncorrelated across time. From the perspective of signal models in k-t RPCA, the presence of physiological noises an increase the effective rank of C(x£) in the background component, while the thermal fluctuations can lower the sparsity level of Ψ(xs) in the dynamic component. The resulting errors in the sparse component could be not trivial with severe thermal noises and thus can be significantly biased. For stable and accurate recovery, k-t RPCA model can be extended by adding the thermal noise term e as a third component as suggested in (61-63):

$$\operatorname*{argmin}_{x_\ell, x_s, e} \lambda_\ell \|C(x_\ell)\|_* + \lambda_s \|\Psi(x_s)\|_1 + \lambda_e \|e\|_2^2 \ s.t. \|y - E(x_\ell + x_s + e)\|_2^2 < \epsilon \quad [3]$$

In the extended k-t RPCA model, the thermal noise term is included in the error term, decreasing the number of wrong sparse entries. Since new data acquisition is a major contribution to this work, modeling of these noise factors in the extended k-t RPCA reconstruction can be considered.

When increasing the slice numbers to 36, the new method can result in scalp fat signal aliasing into the lower part of the coronal images even in the presence of fat saturation pulse preceding the excitation pulse (FIG. 9), in which increased FOV along the slice direction covers the displacement of the fat signals relative to the water signals. Therefore, it is desirable to account for this potential fat confound introduced by the water-fat shift, and there are potential ways to address this. One way is to employ a reverse gradient technique by shifting the fat contribution in an opposite direction for excitation and refocusing pulses (64, 65), thereby resulting in the excited fat spin dephasing during each refocusing pulse. Another way is to adjust the amplitude of the slab selective gradient by changing the pulse duration between the excitation and refocusing (66). Using the different amplitudes of the slice gradient for excitation and refocusing pulses, the fat shift displacement occurs at different positions, thus achieving fat signal suppression while only refocusing the water spins.

The new method is an extension of SE-EPI (7, 8) by adding multiple RF refocusing pulses to achieve three-dimensional imaging. Nevertheless, the new method is different from SE-EPI in that T1-weighted stimulated echo contribution to the signal is directly involved with VFAs in the later part of the echo train. That is, the new method increases diffusion time of the local magnetic field gradients surrounding deoxyhemoglobin-containing capillaries and venules, resulting in increased BOLD sensitivity at the cost of moderate specificity between GE- and SE-EPI. On the other hand, balanced steady-state free precession (bSSFP) (69, 70) is composed of spin and stimulated echoes from previous TR like the new method, thus leading to similar BOLD contrast although a detailed analysis of its impact on the specificity is not known to have been published. Additionally, it further improves image sharpness due to a property of a steady-state for each TR. However, bSSFP still has some limitations in detecting T2-weighted BOLD contrast due to potential banding artifacts and achieving high resolution due to the larger number of PE lines compared to the zoomed imaging of the proposed method.

The new method increases volume coverage, tSNR, BOLD sensitivity and reduces blurring of 3D GRASE. Compared with R- and V-GRASEs, the new method, with 0.8 mm isotropic resolution, increases the slice number up to 36 slices (from 8 and 18 slices) and reduces the FWHM of the PSFs to 1.1~1.2 pixel (from 3.45 and 2.35 pixel) along the slice direction. The new method effectively widens the applications of GRASE fMRI imaging to high resolution imaging such as cortical layer-specific functional experiments, with large implications for both basic neuroscience and clinical applications.

Appendix 1 is an algorithm 1 that summarizes the random encoding method. Appendix 2 is an unpublished paper that contains the drawings used in this patent specification with renumbering in some cases and subject matter that relates to the disclosure above of this patent specification.

---
Algorithm 1

Pseudocode for accelerated V-GRASE random encoding scheme

---
Initialization:
Refocusing pulse index - r, Total number of refocusing pulses - $N_r$, Total number of EPI train - $N_e$ Probability density functions - $D_z = 1/w_r$, where $w_r = \text{ceil}\,\dfrac{r+1}{2}$ $D_y = \text{gaussian}(\text{avg}=0, \text{std}=1)$
Set of $r^{th}$ $k_z$ space band - $K_z^r$, $k_y$ space maximum distance - $\Delta k_y$
Function:
% $k_z$ random encoding
for r = 1:$N_r$ do
    if r == odd $r^{th}$ $k_z$ space band: $K_z^r = (-1)^{r-1}\,\dfrac{r(r-1)+2}{2}\Delta k_z,$
        $(-1)^{r-1}\,\dfrac{r(r+1)}{2}\Delta k_z$ ---
Algorithm 1

Pseudocode for accelerated V-GRASE random encoding scheme

---
    else $r^{th}$ $k_z$ space band: $K_z^r = (-1)^{r-1}\,\dfrac{r(r+1)}{2}\Delta k_z,$
        $(-1)^{r-1}\,\dfrac{r(r-1)+2}{2}\Delta k_z$ end if
    randomly draw $k_z \in K_z^r$
    % $k_y$ random encoding
    for n=1:$N_e$ do
        if n $\leq$ $N_y/2$
            randomly draw $k_z \in \{1, 2, \ldots, N_y/2\}$
            according to $D_y$
        else
            randomly draw $k_z \in \{N_y/2 + 1, N_y/2 + 2, \cdots,$
            $N_y\}$ according to $D_y$
        end
    end for
end for
Output: sets of $k_y$ and $k_z$ indices

---

TABLE 1

Imaging parameters in R-GRASE, V-GRASE, and Accel V-GRASE

| | R-GRASE | V-GRASE | Accel V-GRASE |
|---|---|---|---|
| FOV (mm³) | 89.6 × 22.4 × 6.4 | 89.6 × 22.4 × 14.4 | 89.6 × 22.4 × 19.2 and 28.8 |
| Matrix | 112 × 28 × 8 | 112 × 28 × 18 | 112 × 28 × 24 and 36 |
| TR/TE$_{eff}$ (ms) | 3000/38 | 3000/38 | 3000/24 |
| SE Factor | 6 | 14 | 10 and 14 |
| EPI Factor | 28 | 28 | 12 |
| BW (Hz/Px) | 1144 | 1144 | 1144 |
| Partial Fourier | 6/8 (Partition) | 6/8 (Partition) | — |
| Net Acceleration | 1.3 | 1.3 | 5.6 and 6 |

Appendix 2: Park S. Torrisi S, Townsend J, Beckett A, Feinberg D, Highly Accelerated Sub-Millimeter Resolution 3D GRACE with Controlled T2 Blurring in T2-Weighted Functional MRI at 7 Tesla, Unpublished Manuscript

REFERENCES

1. Ogawa S, Lee T M, Nayak A S, Glynn P. Oxygenation sensitive contrast in magnetic resonance image of rodent brain at high magnetic fields. Magn Reson Med 1990; 14:68-78.
2. Ogawa S, Lee T M, Kay A R, Tank D W. Brain magnetic resonance imaging with contrast dependent on blood oxygenation. Proc Natl Acad Sci USA 1990; 87:9868-9872.
3. Duyn J H, Moonen C T W, Yperen G H, Boer R W, Luyten P R. Inflow vs. deoxyhemoglobin effects in BOLD functional MRI using gradient echoes at 1.5T. NMR Biomed 1994; 7:83-88.
4. Frahm, J., Merboldt, K. D., Hanicke, W. Functional MRI of human brain activation at high spatial resolution. Magn Reson Med 1993; 29:139-144.
5. Kim, S G, Hendrich, K, Hu, X, Merkle, H, Ugurbil, K. Potential pitfalls of functional MRI using conventional gradient-recalled echo techniques. NMR Biomed 1994; 7:69-74.

6. Uludag K, Muller-Bierl B, Ugurbil K. An integrative model for neuronal activity-induced signal changes for gradient and spin echo functional imaging. Neuroimage 2009; 48:150-165.
7. Yacoub E, Duong T Q, Van De Moortele P F, Lindquist M, Adriany G, Kim S G, Ugurbil K, Hu X. Spin?echo fMRI in humans using high spatial resolutions and high magnetic fields. Magn Reson Med 2003; 49:655-64.
8. Yacoub E, Van De Moortele P F, Shmuel A, Ugurbil K. Signal and noise characteristics of Hahn S E and G E BOLD fMRI at 7 T in humans. Neuroimage 2005; 24:738-750.
9. Duong T Q, Yacoub E, Adriany G, Hu X, Ugurbil K, Kim S G. Micro-vascular BOLD contribution at 4 and 7T in the human brain: gradient-echo and spin-echo fMRI with suppression of blood effects. Magn Reson Med 2003; 49:1019-1027.
10. Yacoub E, Shmuel A, Logothetis N, Uğurbil K. Robust detection of ocular dominance columns in humans using Hahn Spine Echo BOLD functional MRI at 7 Tesla. Neuroimage 2007; 37:1161-1177.
11. Yacoub E, Harel N, Uğurbil K. High-field fMRI unveils orientation columns in humans. Proc Natl Acad Sci USA 2008; 105:10607-10612.
12. Feinberg D A, Hoenninger J C, Crooks L E, Kaufman L, Watts J C, Arakawa M. Inner volume MR imaging: technical concepts and their application. Radiology 1985; 156:743-747.
13. Feinberg D A, Harel N, Ramanna S, Ugurbil K, Yacoub E. Sub-millimeter single-shot 3D GRASE with inner volume selection for T2 weighted fMRI applications at 7 Tesla. In Proceedings of the 16th Annual Meeting of ISMM, Toronto, Ontario, Canada, 2008. Abstract 2373.
14. Feinberg D A, Oshio K. GRASE (gradient- and spin-echo) MR imaging: a new fast clinical imaging technique. Radiology 1991; 181:597-602.
15. Hennig J, Nauerth A, Friedburg H. RARE imaging: a fast imaging method for clinical MR Magn Reson Med 1986; 6:823-833.
16. Kemper V G, De Martino F, Vu A T, Poser B A, Feinberg D A, Goebel R, Yacoub E. Sub-millimeter T2 weighted fMRI at 7 T: comparison of 3D-GRASE and 2D SE-EPI. Front Neurosci 2015; 9:163.
17. Mugler J P, III, Bao S, Mulkern R V, Guttmann C R, Robertson R L, Jolesz F A, Brookeman J R. Optimized single-slab three-dimensional spin-echo MR imaging of the brain. Radiology 2000; 216:891-899.
18. Mugler J P, III, Kiefer B, Brookeman J R. Three-dimensional T2-weighted imaging of the brain using very long spin-echo trains. In Proceedings of the 8th Annual Meeting of ISMRM, Denver, Colorado, USA. 2000. p. 687.
19. Kemper V G, Martino F D, Yacoub E, Rainer G. Variable flip angle 3D-GRASE for high resolution fMRI at 7 tesla. Magn Reson Med 2016; 76:897-904.
20. Goerke U, van de Moortele P F, Ugurbil K. Enhanced relative BOLD signal changes in T (2)-weighted stimulated echoes. Magn Reson Med 2007; 58:754-762.
21. Koopmans, P J, Yacoub, E. Strategies and prospects for cortical depth dependent T2 and T2* weighted BOLD fMRI studies. NeuroImage 2019; 197:668-676.
22. Pruessmann K P, Weiger M, Scheidegger M B, Boesiger P. SENSE: sensitivity encoding for fast MRI. Magn Reson Med 1999; 42:952-962.
23. Griswold M A, Jakob P M, Heidemann R M, Nittka M, Jellus V, Wang J M, Kiefer B, Haase A. Generalized Autocalibrating Partially Parallel Acquisitions (GRAPPA). Magn Reson Med 2002; 47:1202-1210.
24. Lustig M, Pauly J M. SPIRIT: iterative self-consistent parallel imaging reconstruction from arbitrary k-space. Magn Reson Med 2010; 64:457-471.
25. Uecker M, Lai P, Murphy M J, Virtue P, Elad M, Pauly J M, Vasanawala S S, Lustig M. ESPIRIT—An eigenvalue approach to auto-calibrating parallel MRI: Where SENSE meets GRAPPA. Magn Reson Med 2014; 71:990-1001.
26. Lustig M, Donoho D, Pauly J M. Sparse MRI: the application of compressed sensing for rapid MR imaging. Magn Reson Med 2007; 58:1182-1195.
27. Gamper U, Boesiger P, Kozerke S. Compressed sensing in dynamic MRI. Magn Reson Med 2008; 59:365-373.
28. Jung H, Sung K, Nayak K S, Kim E Y, Ye J C. k-t FOCUSS: a general compressed sensing framework for high resolution dynamic MRI. Magn Reson Med 2009; 61:103-116.
29. Murphy M, Alley M, Demmel J, Keutzer K, Vasanawala S, Lustig M. Fast fi-SPIRIT Compressed Sensing Parallel Imaging MRI: Scalable Parallel Implementa-tion and Clinically Feasible Runtime. IEEE transactions on medical imaging. 2012; 31:1250-62.
30. Otazo R, Kim D, Axel L, Sodickson D K. Combination of compressed sensing and parallel imaging for highly accelerated first-pass cardiac perfusion MRI. Magn Reson Med 2010; 64:767-776
31. Kim D, Dyvorne H A, Otazo R, Feng L, Sodickson D K, Lee V S. Accelerated phase-contrast cine MRI using k-t SPARSE-SENSE. Magn Reson Med 2012; 67:1054-1064.
32. Feng L, Srichai M B, Lim R P, Harrison A, King W, Adluru G, Dibella E V, Sodickson D K, Otazo R, Kim D. Highly accelerated real-time cardiac cine MRI using k-t SPARSE-SENSE. Magn Reson Med 2013; 70:64-74.
33. Jeromin O, Pattichis M S, Calhoun V D. Optimal compressed sensing reconstructions of fMRI using 2D deterministic and stochastic sampling geometries. Biomed Eng online 2012; 11:25.
34. Zong X, Lee J, Poplawsky A J, Kim S G, Ye J C. Compressed sensing fMRI using gradient-recalled echo and EPI sequences. NeuroImage. 2014; 92:312-21.
35. Fang Z, Van Le N, Choy M, Lee J H. High spatial resolution compressed sensing (HSPARSE) functional MRI. Magn Reson Med 2016; 76:440-55.
36. Chiew M, Smith S M, Koopmans P J, Graedel N N, Blumensath T, Miller K L. k-t FASTER: acceleration of functional MRI data acquisition using low rank constraints. Magn Reson Med 2015; 74:353-364.
37. Petrov A Y, Herbst M, Stenger V A. Improving temporal resolution in fMRI using a 3D spiral acquisition and low rank plus sparse (L+S) reconstruction. NeuroImage 2017; 157:660-674.
38. Tremoulheac B, Dikaios N, Atkinson D, Arridge S R. Dynamic MR Image Reconstruction-Separation From Undersampled (k, t)-Space via Low-Rank Plus Sparse Prior. IEEE Trans Med Imaging. 2014; 33:1689-701.
39. Otazo R, Candes E, Sodickson D K. Low-rank plus sparse matrix decomposition for accelerated dynamic MRI with separation of background and dynamic components. Magn Reson Med 2015; 73:1125-1136.
40. Weizman L, Miller K L, Eldar Y C, Chiew M. PEAR: PEriodic And fixed Rank separation for fast fMRI. Med Phys 2017; 44:6166-6182.

41. Jovicich J, Norris D G. GRASE imaging at 3 Tesla with template interactive phase-encoding. Magn Reson Med. 1998; 39:970-979.
42. Kemper V G. Submillimeter T2 weighted BOLD fMRI of human visual cortex. PhD thesis, Maastricht University, 2016.
43. Chaimow D, Shmuel A. A more accurate account of the effect of k-space sampling and signal decay on the effective spatial resolution in functional MRI. bioRxiv. 2017; 097154.
44. Park J, Kim E Y. Contrast-enhanced, three-dimensional, whole-brain, black-blood imaging: Application to small brain metastases. Magn Reson Med 2010; 63:553-561.
45. Mugler J P, Meyer H, Kiefer B. Practical implementation of optimized tissue-specific prescribed signal evolutions for improved turbo-spin-echo imaging. In Proceedings of the 11th Annual Meeting of ISMRM 2003 p. 203.
46. Park J, Mugler III J P, Horger W, Kiefer B. Optimized T1-weighted contrast for single-slab 3D turbo spin-echo imaging with long echo trains: application to whole?brain imaging. Magn Reson Med 2007; 58:982-992.
47. She H, Chen R R, Liang D, DiBella E V, Ying L. Sparse BLIP: BLind Iterative Parallel imaging reconstruction using compressed sensing. Magn Reson Med 2014; 71:645-660.
48. Huber L, Handwerker D A, Jangraw D C, Chen G, Hall A, Stüber C, Gonzalez-Castillo J, Ivanov D, Marrett S, Guidi M, Goense J. High-resolution CBV-fMRI allows mapping of laminar activity and connectivity of cortical input and output in human M1. Neuron 2017; 96:1253-1263.
49. Peirce J W. PsychoPy-psychophysics software in Python. J Neurosci Methods 2007; 162:8-13.
50. Cox R W. AFNI: software for analysis and visualization of functional magnetic res-onance neuroimages. Comput Biomed Res 1996; 29:162-173.
51. Chen G, Saad Z S, Nath A R, Beauchamp M S, Cox R W. FMRI group analysis com-bining effect estimates and their variances. Neuroimage. 2012; 60:747-765.
52. Olszowy W, Aston J, Rua C, Williams G B. Accurate autocorrelation modeling substantially improves fMRI reliability. Nature communications. 2019; 10:1-1.
53. Cox R W, Chen G, Glen D R, Reynolds R C, Taylor P A. FMRI clustering in AFNI: false-positive rates redux. Brain connectivity. 2017; 7:152-171.
54. Cox R W, Chen G, Glen D R, Reynolds R C, Taylor P A. fMRI clustering and false-positive rates. Proceedings of the National Academy of Sciences. 2017; 114: E3370-1.
55. Beckmann C F, Smith S M. Probabilistic independent component analysis for func-tional magnetic resonance imaging. IEEE Trans Med Imaging. 2004; 23:137-152.
56. Jenkinson, M, Beckmann, C F, Behrens, T E J, Woolrich, M W, Smith, S M. FSL. Neuroimage 2012; 62:782-790.
57. Vidorreta M, Wang Z, Chang Y V, Wolk D A, Fernandez-Seara M A, Detre J A. Whole-brain background-suppressed pCASL MRI with 1D-accelerated 3D RARE Stack-Of-Spirals readout. PloS one. 2017; 12 (8).
58. Yamamoto T, Okada T, Fushimi Y, Yamamoto A, Fujimoto K, Okuchi S, Fukutomi H, Takahashi J C, Funaki T, Miyamoto S, Stalder A F. Magnetic resonance angiog-raphy with compressed sensing: an evaluation of moyamoya disease. PloS one. 2018; 13 (1).
59. Graser H U, Smith S P, Tier B. A derivative-free approach for estimating variance components in animal models by restricted maximum likelihood. J Anim Sci 1987; 64:1362-1370.
60. Penny W D, Friston K J, Ashburner J T, Kiebel S J, Nichols T E. Statistical parametric mapping: the analysis of functional brain images. Elsevier; 2011.
61. Tao M, Yuan X. Recovering low-rank and sparse components of matrices from incomplete and noisy observations. SIAM J Optimiz, 2011; 21:57-81
62. Oreifej O, Li X, Shah M. Simultaneous video stabilization and moving object detection in turbulence. IEEE Trans Pattern Anal Mach Intell, 2012; 35:450-462.
63. Ye X, Yang J, Sun X, Li K, Hou C, Wang Y. Foreground-?background separation from video clips via motion-assisted matrix restoration. IEEE Trans Circuits Syst, 2015; 25:1721-34.
64. Volk A, Tiffon B, Mispelter J, Lhoste J M. Chemical shift-specific slice selection. A new method for chemical shift imaging at high magnetic field. J Magn Reson 1987; 71:168-174.
65. Wilm B J, Svensson J, Henning A, Pruessmann K P, Boesiger P, Kollias S S. Reduced field-of-view MRI using outer volume suppression for spinal cord diffusion imaging. Magn Reson Med 2007; 57:625-630.
66. Ivanov D, Schäfer A, Streicher M N, Heidemann R M, Trampel R, Turner R. A simple low-SAR technique for chemical-shift selection with high-field spin-echo imaging. Magn Reson Med 2010; 64:319-326.
67. Friston K J, Worsley K J, Frackowiak R S, Mazziotta J C, Evans A C. Assessing the significance of focal activations using their spatial extent. Hum Brain Mapp. 1994; 1:210-220.
68. Boynton, G M and Engel, S A and Glover, G H and Heeger, D J. Linear systems analysis of functional magnetic resonance imaging in human V1. J Neurosci 1996; 16:4207-4221.
69. Miller K L, Smith S M, Jezzard P, Pauly J M. High resolution FMRI at 1.5 T using balanced SSFP. Magn Reson Med 2006; 55:161-170.
70. Miller K L. FMRI using balanced steady-state free precession (SSFP). Neuroimage. 2012; 62:713-719.

The invention claimed is:

1. A magnetic resonance imaging (MRI) system comprising:
a source of spatially slab-selective excitation and refocusing pulses applied along orthogonal directions to select a sub-volume of interest at their intersection in an object in a steady magnetic field;
a source of refocusing radio frequency (RF) pulses successively applied to the object under a condition that includes 90-degree phase difference between the excitation and refocusing pulses, equidistant spacing between two consecutive refocusing pulses, and a constant spin defocusing in each echo spacing;
a source of oscillating readout gradients with alternating polarities and phase encoding (PE) blips between the readout pulses, inserted between adjacent refocusing pulses and applied to the object to produce gradient echo (GE) and spin echo (SE) MRI signals; and
an image processor configured to process the GE and SE MRI signals into images of the object in k-space, including by random encoding comprising randomly designated sampling selected to suppress inter-frame signal variations of the same MRI signals whole maintaining fixed contrast;
wherein the random encoding comprises segmenting a selected k-space in at least one dimension as multiple sub-bands by dividing the selected k-space into several frequency bands according to a selected probability density function (PDF) where the partition encoding is generated by randomly choosing a sample k-space band sequentially according to a centric reordering.

2. A method of functional magnetic resonance imaging comprising:

applying spatially slab-selective excitation and refocusing pulses along orthogonal directions to select a sub-volume of interest at their intersection in an object in a steady magnetic field;

applying refocusing radio frequency (RF) pulses successively to the object under a condition that includes 90-degree phase difference between the excitation and refocusing pulses, equidistant spacing between two consecutive refocusing pulses, and a constant spin defocusing in each echo spacing;

applying oscillating readout gradients with alternating polarities and phase encoding (PE) blips between the readout pulses, inserted between adjacent refocusing pulses and applied to the object to produce gradient echo (GE) and spin echo (SE) MRI signals; and computer-processing the GE and SE MRI signals into images of the object in k-space, including by random encoding comprising randomly designated sampling selected to suppress inter-frame signal variations of the same MRI signals whole maintaining fixed contrast;

wherein the random encoding comprises $K_2$-space as multiple sub-bands by dividing into several frequency bands according to a selected probability density function (PDF) where the partition encoding is generated by randomly choosing a sample $k_z$-space band sequentially according to a centric reordering.

3. The system of claim 1, in which the PDF conforms to $1/w_r$, where $w_r$ is the number of k-space lines in the $r^{th}$ selected k-space band defined as: $w_r=\text{ceil}((r+1)/2$.

4. The system of claim 1, in which the maximum flip angle is set to no more than 150 degrees.

5. The system of claim 1, in which said sources and image processor operate in an accelerated sub-millimeter resolution mode functional MRI (fMRI).

6. The method of claim 2, in which the PDF conforms to $1/w_r$, where $w_r$ is the number of k-space lines in the $r^{th}$ $k_z$-space band defined as: $w_r=\text{ceil}((r+1)/2$.

7. The method of claim 2, in which the maximum flip angle is set to no more than 150 degrees.

8. The method of claim 2, in which said sources and image processor operate in an accelerated sub-millimeter resolution mode functional MRI (fMRI).

9. The system of claim 3, in which the selected k-space is $K_z$-space.

10. The system of claim 5, in which said sources and image processor are configured to operate in a 3D GRAS with controlled T2 blurring in T2-weighted functional MRIE mode with controlled T2 blurring in T2-weighted fMRI mode.

11. The method of claim 6, in which a selected number of several of the last samples are randomly determined from the rest of the peripheral upper and lower $k_z$-spaces.

12. The method of claim 8, in which said sources and image processor are configured to operate in a 3D GRASE mode with controlled T2 blurring in T2-weighted fMRI mode.

13. The system of claim 9, in which a selected number of several of the last samples are randomly determined from the rest of the peripheral upper and lower $k_z$-spaces.

14. The method of claim 11, in which the slice and refocusing pulse numbers are selected to balance between center and peripheral samples to yield a statistical blurring due to an acquisition bias in k-space.

15. The system of claim 13, in which the slice and refocusing pulse numbers are selected to balance between center and peripheral samples to yield a statistical blurring due to an acquisition bias in k-space.

16. The method of claim 14, in which said processing uses the same number of $k_y$-space lines between upper and lower k-spaces for a constant TE across time.

17. The system of claim 15, in which the k-space includes, in addition to the selected $k_z$-space, a $k_y$-space and said processor uses the same number of $k_y$-space lines between upper and lower k-spaces for a constant TE across time.

* * * * *